US012572455B2

(12) United States Patent　　(10) Patent No.: US 12,572,455 B2
Liu　　(45) Date of Patent: Mar. 10, 2026

(54) DUAL-PORT MEMORY MODULE DESIGN FOR COMPOSABLE COMPUTING

(71) Applicant: Huawei Technologies Co., Ltd., Shenzhen (CN)

(72) Inventor: Jinshui Liu, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/350,042

(22) Filed: Jul. 11, 2023

(65) Prior Publication Data

US 2023/0350795 A1　　Nov. 2, 2023

Related U.S. Application Data

(63) Continuation of application No. PCT/US2021/018839, filed on Feb. 19, 2021.

(51) Int. Cl.
*G06F 12/00* (2006.01)
*G06F 12/02* (2006.01)

(52) U.S. Cl.
CPC .. *G06F 12/0223* (2013.01); *G06F 2212/1012* (2013.01)

(58) Field of Classification Search
CPC ..................... G06F 12/0223; G06F 2212/1012
See application file for complete search history.

(56) References Cited

U.S. PATENT DOCUMENTS

| | | | | |
|---|---|---|---|---|
| 2006/0062047 A1* | 3/2006 | Bhakta | ................... | G11C 5/066 |
| | | | | 711/E12.003 |
| 2007/0192561 A1* | 8/2007 | Satoyama | ............. | G06F 3/0614 |
| | | | | 711/170 |
| 2009/0210691 A1* | 8/2009 | Im | ....................... | G06F 12/0607 |
| | | | | 713/2 |
| 2011/0099325 A1* | 4/2011 | Roh | ..................... | G06F 3/0679 |
| | | | | 711/E12.008 |
| 2012/0159061 A1 | 6/2012 | Hampel et al. | | |
| 2013/0311746 A1* | 11/2013 | Raindel | .............. | G06F 12/0292 |
| | | | | 711/206 |

(Continued)

FOREIGN PATENT DOCUMENTS

WO　WO-2022177573 A1　8/2022

OTHER PUBLICATIONS

"International Application Serial No. PCT US2021 018839, International Preliminary Report on Patentability mailed Aug. 31, 2023", 7 pages.

(Continued)

*Primary Examiner* — Craig S Goldschmidt
(74) *Attorney, Agent, or Firm* — Schwegman Lundberg & Woessner, P.A.

(57) ABSTRACT

An efficient structure and methodology are provided for implementing a dual-port memory module to provide improved memory capacity composability, expansion and sharing. This dual-port memory module uses high-speed SerDes or Optical based redundant access ports for connection to one or more CPUs or compute nodes, where each access port may access part or all of the module's memory capacity under configuration. This provides improvement for memory capacity composability, expansion through memory sharing and improved memory access performance and reliability for composable computing applications.

19 Claims, 19 Drawing Sheets

500

510　Differential DIMM　530

DRAM DRAM DRAM DRAM DRAM

DIFFERENTIAL DIMM CONTROLLER

DRAM DRAM DRAM DRAM

DRAM Interface

520 SerDes Interface

525 Host Interface Connector

(56) References Cited

U.S. PATENT DOCUMENTS

| | | |
|---|---|---|
| 2019/0042511 A1 | 2/2019 | Nachimuthu et al. |
| 2019/0212769 A1* | 7/2019 | Carlough ............ G06F 13/1689 |

OTHER PUBLICATIONS

"International Application Serial No. PCT/US2021/018839, International Search Report mailed Nov. 23, 2021", 4 pgs.
"International Application Serial No. PCT/US2021/018839, Written Opinion mailed Nov. 23, 2021", 5 pgs.

* cited by examiner

100
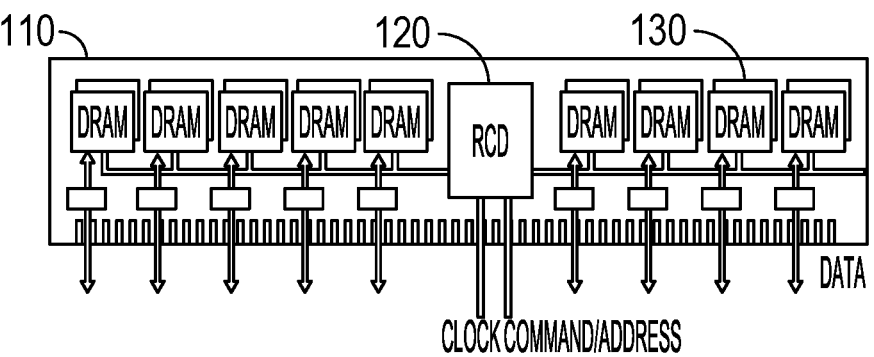
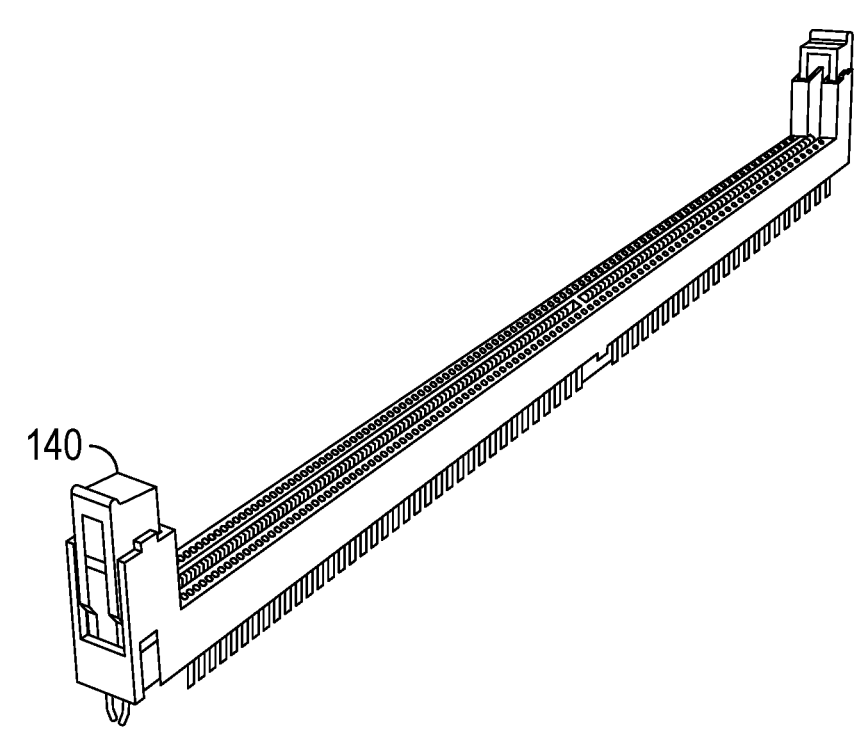
FIG. 1

200

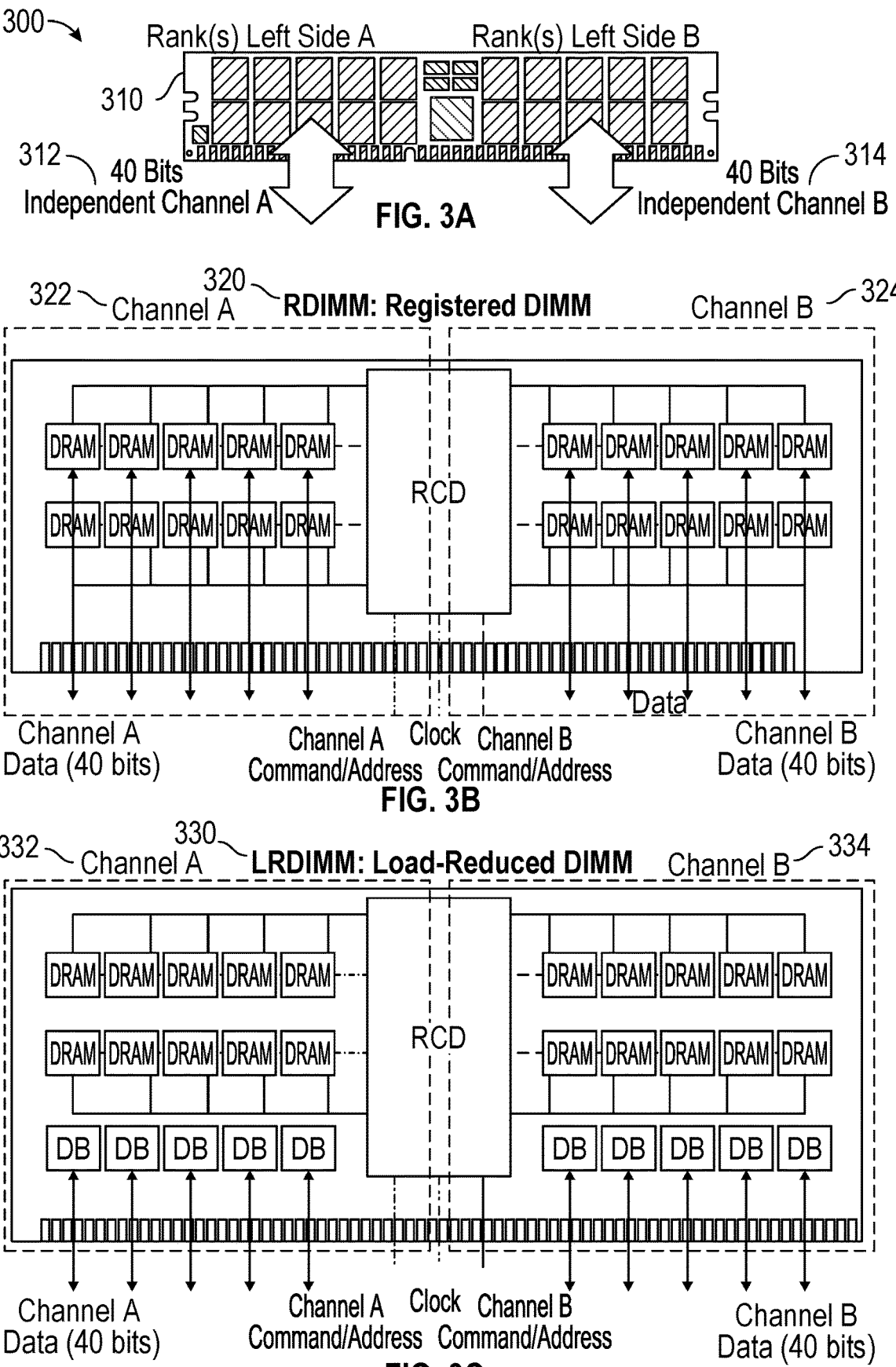

300

Rank(s) Left Side A     Rank(s) Left Side B

310

312 40 Bits
Independent Channel A

FIG. 3A

40 Bits 314
Independent Channel B

322 Channel A   320   RDIMM: Registered DIMM   Channel B 324

DRAM DRAM DRAM DRAM DRAM   RCD   DRAM DRAM DRAM DRAM DRAM

DRAM DRAM DRAM DRAM DRAM     DRAM DRAM DRAM DRAM DRAM

Data

Channel A
Data (40 bits)

Channel A
Command/Address

Clock

Channel B
Command/Address

Channel B
Data (40 bits)

FIG. 3B

332 Channel A   330   LRDIMM: Load-Reduced DIMM   Channel B 334

DRAM DRAM DRAM DRAM DRAM   RCD   DRAM DRAM DRAM DRAM DRAM

DRAM DRAM DRAM DRAM DRAM     DRAM DRAM DRAM DRAM DRAM

DB DB DB DB DB     DB DB DB DB DB

Channel A
Data (40 bits)

Channel A
Command/Address

Clock

Channel B
Command/Address

Channel B
Data (40 bits)

FIG. 3C

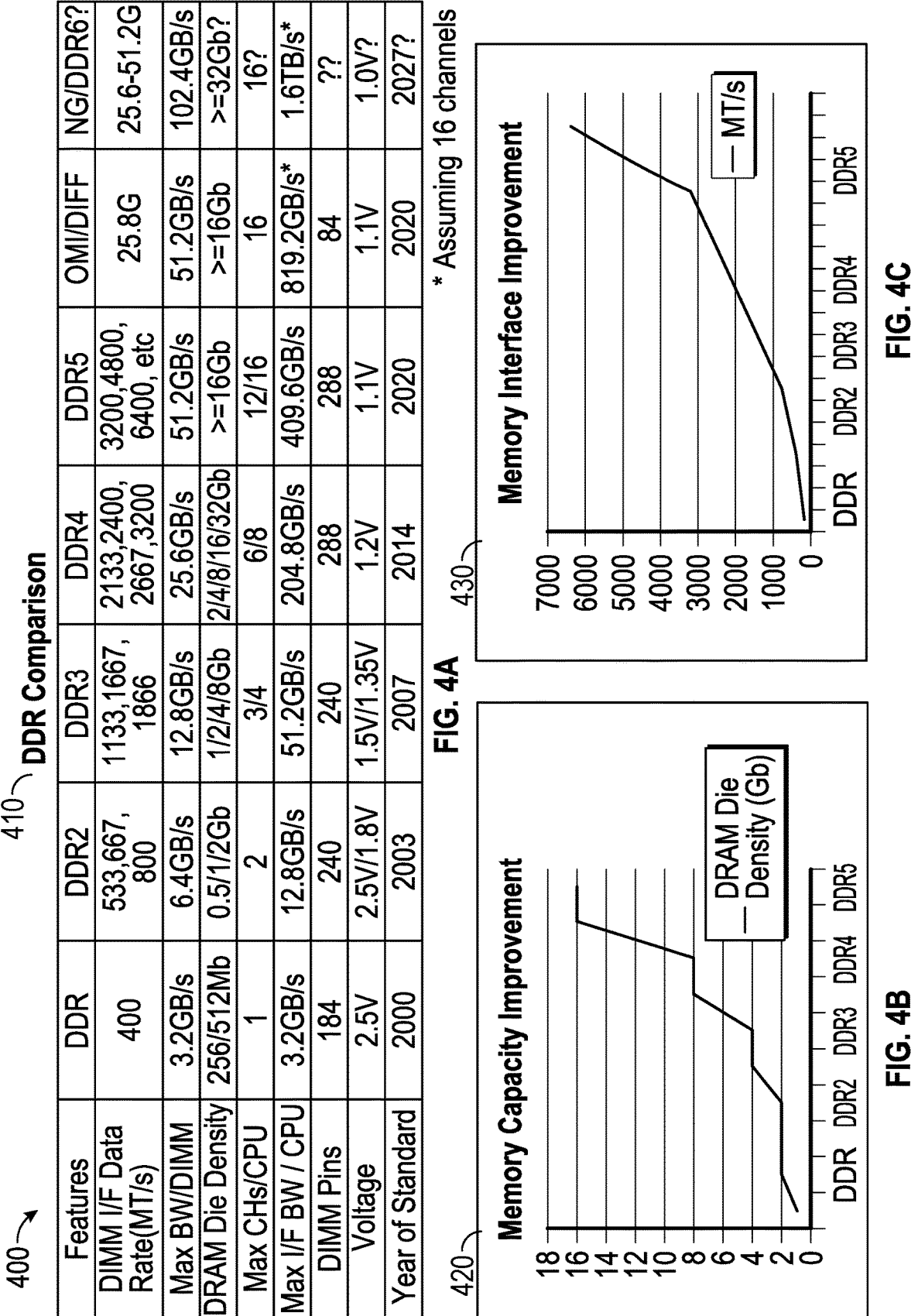

400 ⟶

410 ⟶ DDR Comparison

| Features | DDR | DDR2 | DDR3 | DDR4 | DDR5 | OMI/DIFF | NG/DDR6? |
|---|---|---|---|---|---|---|---|
| DIMM I/F Data Rate(MT/s) | 400 | 533,667, 800 | 1133,1667, 1866 | 2133,2400, 2667,3200 | 3200,4800, 6400, etc | 25.8G | 25.6-51.2G |
| Max BW/DIMM | 3.2GB/s | 6.4GB/s | 12.8GB/s | 25.6GB/s | 51.2GB/s | 51.2GB/s | 102.4GB/s |
| DRAM Die Density | 256/512Mb | 0.5/1/2Gb | 1/2/4/8Gb | 2/4/8/16/32Gb | >=16Gb | >=16Gb | >=32Gb? |
| Max CHs/CPU | 1 | 2 | 3/4 | 6/8 | 12/16 | 16 | 16? |
| Max I/F BW / CPU | 3.2GB/s | 12.8GB/s | 51.2GB/s | 204.8GB/s | 409.6GB/s | 819.2GB/s* | 1.6TB/s* |
| DIMM Pins | 184 | 240 | 240 | 288 | 288 | 84 | ?? |
| Voltage | 2.5V | 2.5V/1.8V | 1.5V/1.35V | 1.2V | 1.1V | 1.1V | 1.0V? |
| Year of Standard | 2000 | 2003 | 2007 | 2014 | 2020 | 2020 | 2027? |

FIG. 4A

* Assuming 16 channels

430 ⟶

Memory Interface Improvement

— MT/s 7000
6000
5000
4000
3000
2000
1000
0

DDR  DDR2 DDR3 DDR4  DDR5

Memory Capacity Improvement

— DRAM Die Density (Gb)

18
16
14
12
10
8
6
4
2
0

DDR  DDR2 DDR3 DDR4  DDR5

FIG. 4B

Differential DIMM

DRAM

600

| Parameter | 1C | 2C | 4C | 4C+ |
|---|---|---|---|---|
| Total Contacts | 56 | 84 | 140 | 168 |
| Max Differential Pairs | 18 | 26 | 44 | 52 |
| Rec. SerDes Lanes | 4x | 8x | 16x | 16x |
| Length (mm) | 24.03 | 35.75 | 57.17 | 69.32 |
| Critical Length (mm) | 25.08 | 36.80 | 58.22 | 69.62 |
| Used by | SFF, OCP, Gen-Z | OCP, Gen-Z, OMI | OCP, Gen-Z | OCP, Gen-Z |

SNIA-SFF-TA-1002 Connectors — 610

LEFT: CURRENT MAINSTREAM SERVER DESIGN: MEMORY, STORAGE AND ACCELERATOR ARE ATTACHED TO CPU DIRECTLY. EACH SERVER COULD HAVE 1 TO N CPUS (PROCESSORS)

RIGHT: CURRENT DOABLE/FEASIBLE COMPOSABLE STORAGE OR ACCELERATION

HBM AND INTERCONNECT WITH CPU/GPU/SOC DIE

1100 ⟶

| Parameter | HBM1 | HBM2 | HBM2E | HBM3 |
|---|---|---|---|---|
| Number of Hi (Layers of DRAM Dies) | 4 | 8 | 8/12 | 8/12/16? |
| DRAM Die Density | 8Gb | 8Gb | 16Gb | 32Gb? |
| Stack Density (GB) | 4GB | 8GB | 16GB/24GB | 32/48/64GB |
| Pin Data Rate (Gb/s) | 1 | 2 | 2.4-3.2-3.6 | 4-6.4? |
| Data Width (Bits) | 1024 | 1024 | 1024 | 1024 |
| BW/Stack (Gb/s) | 128 | 256 | 307/410/460 | 512+ |

Figure 12:
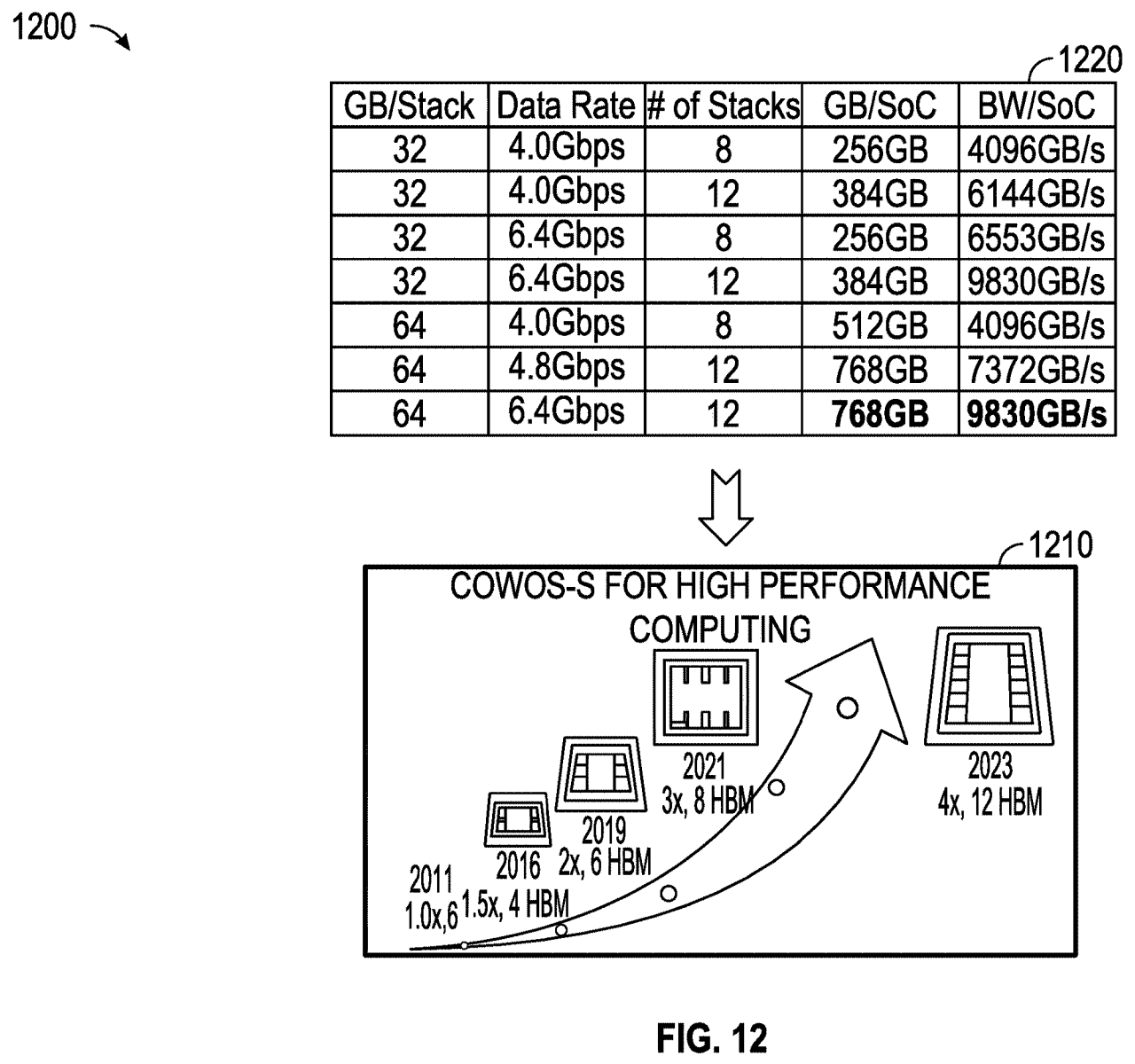

| GB/Stack | Data Rate | # of Stacks | GB/SoC | BW/SoC |
|----------|-----------|-------------|--------|--------|
| 32 | 4.0Gbps | 8 | 256GB | 4096GB/s |
| 32 | 4.0Gbps | 12 | 384GB | 6144GB/s |
| 32 | 6.4Gbps | 8 | 256GB | 6553GB/s |
| 32 | 6.4Gbps | 12 | 384GB | 9830GB/s |
| 64 | 4.0Gbps | 8 | 512GB | 4096GB/s |
| 64 | 4.8Gbps | 12 | 768GB | 7372GB/s |
| 64 | 6.4Gbps | 12 | 768GB | 9830GB/s |

1210

COWOS-S FOR HIGH PERFORMANCE COMPUTING 2011
1.0x,6

2016
1.5x, 4 HBM 2019
2x, 6 HBM 2021
3x, 8 HBM 2023
4x, 12 HBM

METHOD OF DUAL-PORT MEMORY MODULE ACCESS

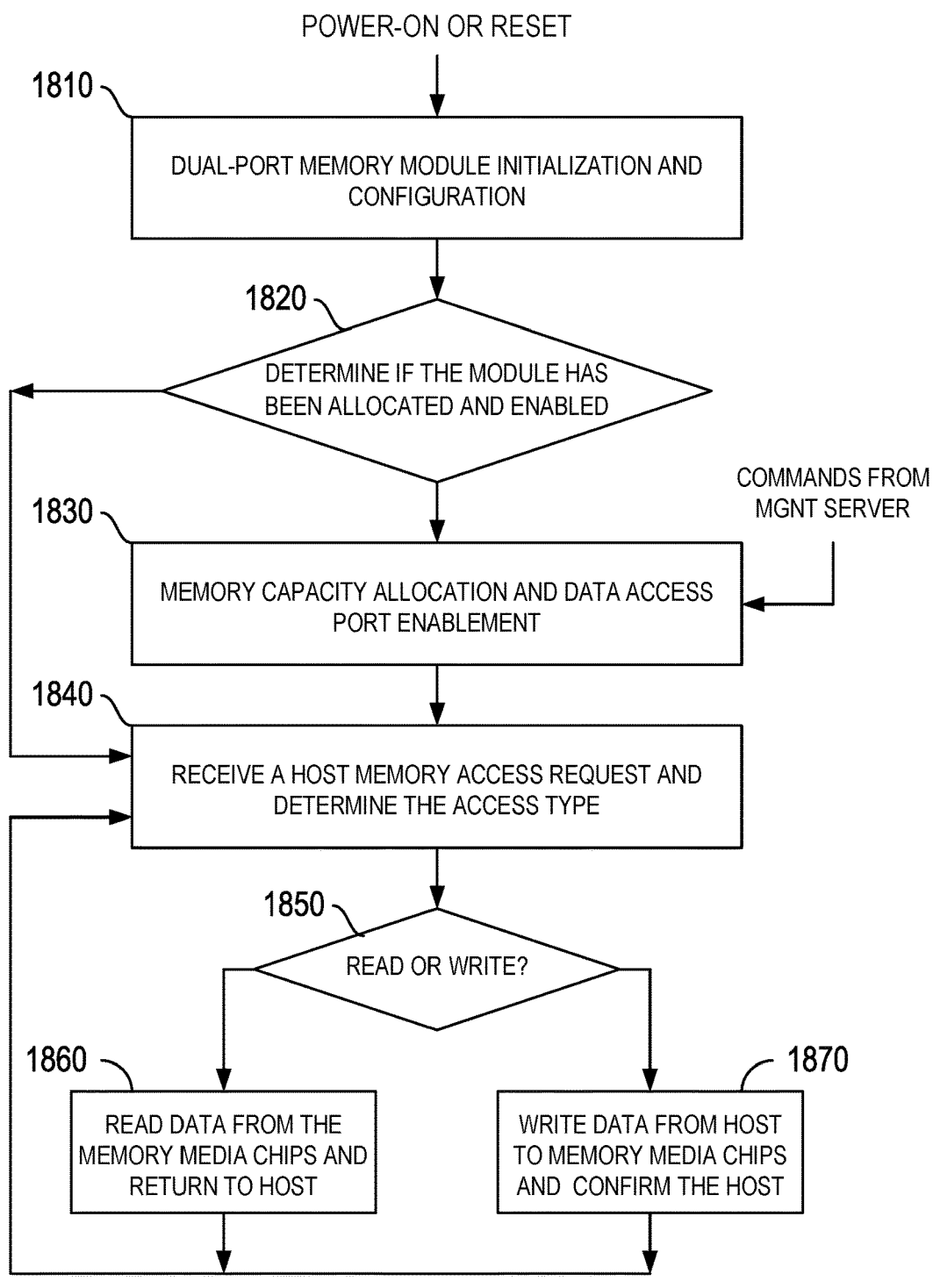

POWER-ON OR RESET

1810
DUAL-PORT MEMORY MODULE INITIALIZATION AND CONFIGURATION

1820
DETERMINE IF THE MODULE HAS BEEN ALLOCATED AND ENABLED

COMMANDS FROM MGNT SERVER

1830
MEMORY CAPACITY ALLOCATION AND DATA ACCESS PORT ENABLEMENT

1840
RECEIVE A HOST MEMORY ACCESS REQUEST AND DETERMINE THE ACCESS TYPE

1850
READ OR WRITE?

1860
READ DATA FROM THE MEMORY MEDIA CHIPS AND RETURN TO HOST

1870
WRITE DATA FROM HOST TO MEMORY MEDIA CHIPS AND CONFIRM THE HOST

FIG. 18

DUAL-PORT MEMORY MODULE DESIGN FOR COMPOSABLE COMPUTING

PRIORITY CLAIM

This application is a continuation of International Application No. PCT/US2021/018839, filed on Feb. 19, 2021, entitled "DUAL-PORT MEMORY MODULE DESIGN FOR COMPOSABLE COMPUTING," the benefit of priority of which is claimed herein, and which application is hereby incorporated herein by reference in its entirety.

TECHNICAL FIELD

The present disclosure is related to computing memory modules, and in particular, to methods and apparatus to provide redundant high-speed Serializer and Deserializer (SerDes) access ports for connection to multiple computing processors or compute nodes for memory capacity composability on-demand, expansion and sharing, and composable computing enablement.

BACKGROUND

In computing applications, random-access memory (RAM) typically provides higher speed access but less total storage capacity than primary storage (e.g., hard drive storage or solid-state drive (SSD) storage). One key difference between RAM and the primary storage including NAND memory for SSD is that RAM is a byte-addressable device and accessed with memory-semantic LOAD(READ) and STORE(WRITE) commands while storage is block-addressable device and accessed with block storage protocols such Small Computer System Interface (SCSI) and Non-Volatile Memory express (NVMe). Dynamic RAM (DRAM) is a type of RAM and often used in digital electronics to provide affordable, high-speed, and high-capacity memory. A dual-inline memory module (DIMM) form factor is typically used to attach a DRAM module to a motherboard. In some examples, DRAM DIMM devices use single-port single-ended high-speed signals for attachment to a memory controller or central processing unit (CPU) with an integrated DRAM controller. A typical DRAM DIMM includes a memory module that houses multiple DRAM devices. As processing speed continue to increase, the demand for larger and faster access to DRAM will continue to increase. As different applications may have different memory capacity requirements, it is desirable that the memory capacity of a compute node or server could be changed on-demand dynamically without changing the DIMMs, such as to provide composable computing.

SUMMARY

It is an object of various embodiments to provide an efficient architecture and methodology for implementing a dual-port RAM module to provide improved memory capacity composability, expansion and sharing. In particular, this dual-port RAM module uses high-speed SerDes (e.g., 25G NRZ, 112G PAM4, etc.) based redundant access ports for connection to multiple CPUs or compute nodes, where each access port may access part or all of the module's memory capacity under software configuration. This provides improved memory capacity composability and expansion through memory sharing and provides improved memory access performance and reliability. The Summary is not intended to identify key or essential features of the claimed subject matter, nor is it intended to be used to limit the scope of the claimed subject matter.

TABLE 1

| Definition, Acronyms and Abbreviations | |
| --- | --- |
| DRAM | Dynamic Random-Access Memory |
| DIMM | Dual In-Line Memory Module |
| SCM | Storage Class Memory |
| MRAM | Magnetoresistive random-access memory |
| STT-MRAM | Spin-transfer Torque MRAM |
| HBM | High Bandwidth Memory |
| PCM | Phase Change Memory |
| SerDes | Serializer/Deserializer |
| SFF | Small-Form Factor |
| DDR | Double Data Rate |
| DDR5 | Double Data Rate Generation 5 |
| CPU | Central Processing Unit |
| DDIMM | Differential DIMM, a DIMM using one or more SerDes interfaces for host connection |
| CPU | Central Processing Unit, or Processor, or Microprocessor |
| SoC | System on Chip, an integrated circuit with a lot of functions integrated |
| Host | A server Node, or a CPU, or a GPU, or a SoC |
| ASIC | Application Specific Integrated Circuit |
| PCB | Printed Circuit Board |
| PCBA | Printed Circuit Board Assembly |
| JEDEC | Joint Electron Device Engineering Council |
| CXL | Compute Express Link |
| Gen-Z | A memory-semantic access protocol defined by Gen-Z Consortium |
| TSMC | Taiwan Semiconductor Manufacturing Company |

According to a first aspect of the present disclosure, there is provided a dual-port memory module device operable to access computer memory, the device comprising: a plurality of memory media chips providing random access memory (RAM) capacity; and a dual-port memory controller application specific integrated circuit (ASIC) operable to allocate a first portion of the RAM capacity to a first computing host and a second portion of the RAM capacity to a second computing host, the dual-port memory controller ASIC including: a first interface port coupled to a first computing host; a second interface port coupled to a second computing host; and a plurality of memory interface channels operable to configure, read data from, and write data to the plurality of memory media chips.

In a second embodiment of the dual-port memory module device according to the first aspect as such, the device further includes a management port operable to receive module configuration and management data from a configuration management server, the allocation of the a first portion of the RAM capacity and the second portion of the RAM capacity is based on the received module configuration and management data.

In a third embodiment of the dual-port memory module device according to the first aspect as such, the plurality of memory media chips includes at least one of DRAM, SRAM, HBM, STT-MRAM, or PCM.

In a fourth embodiment of the dual-port memory module device according to the first aspect as such, the device further includes a protocol agnostic multi-lane connector operable to: couple the first interface port to the first computing host; couple the second interface port to the second computing host; and couple the management port to the configuration management server.

In a fifth embodiment of the dual-port memory module device according to the first aspect as such, the protocol agnostic multi-lane connector includes an SF-TA-1002 compliant PCB connector.

In a sixth embodiment of the dual-port memory module device according to the first aspect as such, the first computing host accesses the first portion of the RAM capacity and the second computing host accesses the second portion of the RAM capacity with memory-semantic LOAD (READ) and STORE(WRITE) commands.

In a seventh embodiment of the dual-port memory module device according to the first aspect as such, the first interface port and the second interface port each include a Serial and Deserializer (SerDes) port consisting of a plurality of differential lanes for memory access protocol communication.

In an eighth embodiment of the dual-port memory module device according to the first aspect as such, the first interface port and the second interface port each may include an optional differential clock input.

In a ninth embodiment of the dual-port memory module device according to the first aspect as such, the dual-port memory controller ASIC is further operable to configure the memory media chips for access by the first computing host and the second computing host.

In a tenth embodiment of the dual-port memory module device according to the first aspect as such, the device further includes a serial presence detect device, wherein: the dual-port memory controller ASIC reads a memory media configuration from the serial presence detect device; and the configuration of the memory media chips is based on the memory media configuration.

In an eleventh embodiment of the dual-port memory module device according to the first aspect as such, the memory media configuration includes at least one of a memory media type, a memory media capacity, a memory media speed, or a number of memory media chips.

In a twelfth embodiment of the dual-port memory module device according to the first aspect as such, the dual-port memory controller ASIC is further operable to: store memory usage allocation data that indicates the allocation of the first portion of the RAM capacity to the first computing host and the allocation of the second portion of the RAM capacity to the second computing host; and in response to a device power cycle or reset event: retrieve the memory usage allocation data; and restore the allocation of the first portion of the RAM capacity to the first computing host and the second portion of the RAM capacity to the second computing host to provide a persistent configuration in response to the device power cycle or reset event.

According to a second aspect of the present disclosure, there is provided a dual-port memory module method operable to receiving a module configuration request at a management port of a dual-port memory controller application specific integrated circuit (ASIC) of a dual-port memory module coupled by a first port to a first computing host and coupled by a second port to a second computing host; and allocating, in response to receiving the module configuration request, a first portion of RAM capacity to the first computing host and a second portion of the RAM capacity to the second computing host.

In a second embodiment of the dual-port memory module method according to the second aspect as such, the method further includes receiving a module configuration and management data from a configuration management server via a management port at the dual-port memory controller ASIC, the allocation of the first portion of the RAM capacity to the first computing host and the second portion of the RAM capacity to the second computing host is based on the received module configuration and management data.

In a third embodiment of the dual-port memory module method according to the second aspect as such, the plurality of memory media chips includes at least one of DRAM, SRAM, HBM, STT-MRAM, or PCM.

In a fourth embodiment of the dual-port memory module method according to the second aspect as such, the dual-port memory controller ASIC further includes a protocol agnostic multi-lane connector operable to: couple the first interface port to the first computing host; couple the second interface port to the second computing host; and couple the management port to the configuration management server.

In a fifth embodiment of the dual-port memory module method according to the second aspect as such, the protocol agnostic multi-lane connector includes an SF-TA-1002 compliant PCB connector.

In a sixth embodiment of the dual-port memory module method according to the second aspect as such, the first computing host accesses the first portion of the RAM capacity and the second computing host accesses the second portion of the RAM capacity with memory-semantics LOAD(READ) and STORE(WRITE) commands.

In a seventh embodiment of the dual-port memory module method according to the second aspect as such, the method further includes receiving data on a Serial and Deserializer (SerDes) port consisting of a plurality of differential memory lanes for access protocol communication.

In an eighth embodiment of the dual-port memory module method according to the second aspect as such, the method further includes receiving a differential clock input on the first interface port and the second interface port.

In a ninth embodiment of the dual-port memory module method according to the second aspect as such, the method further includes configuring, at the dual-port memory controller ASIC, the memory media chips for access by the first computing host and the second computing host.

In a tenth embodiment of the dual-port memory module method according to the second aspect as such, the method further includes reading, at the dual-port memory controller ASIC, a memory media configuration from a serial presence detect device, the configuration of the memory media chips is based on the memory media configuration.

In an eleventh embodiment of the dual-port memory module method according to the second aspect as such, the memory media configuration includes at least one of a memory media type, a memory media capacity, a memory media speed, or a number of memory media chips.

In a twelfth embodiment of the dual-port memory module method according to the second aspect as such, the method further includes storing memory usage allocation data that indicates the allocation of the first portion of the RAM capacity to the first computing host and the allocation of the second portion of the RAM capacity to the second computing host; and in response to a device power cycle or reset event: retrieving the memory usage allocation data; and restoring the allocation of the first portion of the RAM capacity to the first computing host and the second portion of the RAM capacity to the second computing host to provide a persistent configuration in response to the device power cycle or reset event.

Any one of the foregoing examples may be combined with any one or more of the other foregoing examples to create a new embodiment in accordance with the present disclosure.

BRIEF DESCRIPTION OF THE DRAWINGS

The drawings illustrate generally, by way of example, but not by way of limitation, various embodiments discussed in the present document.

FIG. 1 illustrates an example DRAM DIMM system. This DRAM DIMM system may include DDR4 or DDR5 DIMMs defined by JEDEC. The DIMM is attached to a host or memory controller via a DIMM socket.

FIGS. 3A-3C illustrate 3 types of JEDEC DDR5 DIMMs: UDIMM, RDIMM and LRDIMM. In contrast with DDR4 DIMMs, each DDR5 DIMM is divided into two separate channels (e.g., channel A, channel B), where each channel has one access port for connecting to one memory controller or one host with integrated DD5 memory controllers, and where each channel has access to only half of the DIMM's memory capacity.

FIGS. 4A-4C illustrate an example double data rate (DDR) throughput comparison. FIG. 4 shows the density, interface speed and bandwidth of different DRAM technologies and related DIMMs from DDR to DDR5 and some projections of next generation DDR6.

FIGS. 6A-6E show the SNIA SFF-TA-1002 family connectors that could be used for connecting a differential DIMM with a high-speed SerDes interface and an SFF-TA-1002 compliant PCB connector. The SNIA SFF-TA-1002 specification supports interface speed for up to 112 GT/s with PAM4 SerDes.

FIGS. 9A-9E illustrate the current server designs with DIMM, HDD/SSD storage and accelerators locally attached to one or more CPUs or Processors, along with composable server designs with composable storage and acceleration remotely attached to compute nodes over a Network Fabric.

FIG. 11 shows the HBM technology evolution and performance characteristics.

FIG. 12 shows TSMC SoC-HBM integration roadmap, as well as the feasible memory capacity and bandwidth with different HBM configurations. With the rapid HBM progression, composable memory could be enabled.

FIG. 18 is a flow diagram of features of an embodiment of an example method of the disclosed dual-port memory module.

DETAILED DESCRIPTION

Figure 2A:
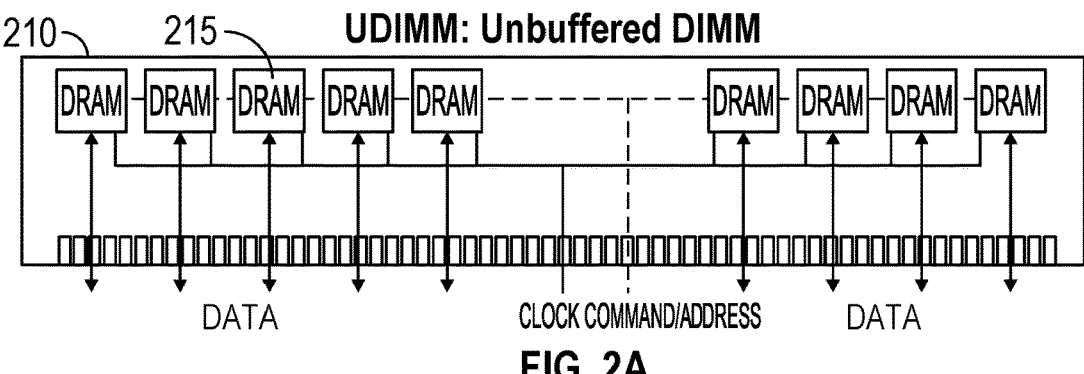
FIGS. 2A-2C illustrate various types of JEDEC DDR4 DIMMs: UDIMM, RDIMM and LRDIMM. For DDR4 DIMMs, there is only one access port or channel to a memory controller or a host with an integrated memory controller.

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized, and that structural, logical, mechanical, and electrical changes may be made. The following description of example embodiments is, therefore, not to be taken in a limited sense.

The functions or algorithms described herein may be implemented in software in an embodiment. The software may comprise computer-executable instructions stored on computer-readable media or computer-readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, application-specific integrated circuit (ASIC), a microprocessor, or other type of processor operating on a computer system, such as a personal computer, server or other computer system, turning such computer system into a specifically programmed machine.

Machine-readable non-transitory media, such as computer-readable non-transitory media, includes all types of computer readable media, including magnetic storage media, optical storage media, and solid state storage media and specifically excludes signals. The software can be installed in and sold with the devices that handle memory allocation as taught herein. Alternatively, the software can be obtained and loaded into such devices, including obtaining the software via a disc medium or from any manner of network or distribution system, including, for example, from a server owned by the software creator or from a server not owned but used by the software creator. The software can be stored on a server for distribution over the Internet, for example.

As used herein, the term "memory module" refers to a printed circuit board assembly (PCBA) with memory control integrated circuits and memory media chips are mounted on a printed circuit board (PCB). A dual in-line memory module (DIMM) has separate contacts on each side of the PCB. Memory modules may have a 32-bit data path, a 64-bit data path or use another data path size. Different memory modules may have different numbers of pins (e.g., 72 pins, 100 pins, 144 pins, 278 pins, or 288 pins) and operate at different voltages (e.g., 5.0 V, 3.3 V, 2.5 V, 1.8 V, 1.5 V, or 1.2 V).

A host computer reads data from a memory module by providing an address to read from and a read command signal on input pins of the memory module. The memory module responds by providing the read data on output pins of the memory module. The host computer writes data to a memory module by providing an address to write to and a data value on input pins of the memory module. In case of a differential DIMM with a SerDes interface to the host, the access command and data are encapsulated into a packet transferred over the SerDes interface.

A dual-channel memory module operates as two independent channels for accessing memory. Each channel has its own set of input and output pins. Additionally, the memory chips on the dual-channel memory module are divided between the two channels physically. Thus, data written using one channel cannot be read using the other channel Nor can the distribution of the memory between the channels be altered after manufacturing.

As described herein, a dual-port memory module provides two sets of input and output pins, but the memory capacity of the dual-port memory module is divided between the ports by a dual-port memory controller ASIC. Accordingly, the allocation of the memory capacity of the memory module to each port can be changed after manufacturing. By comparison with dual-channel memory modules, dual-port memory modules provide greater flexibility, allowing more efficient use of computing resources and enabling composable memory for composable computing. The term "multiport memory module" encompasses memory modules with more than one port (e.g., the two ports of a dual-port memory module, three ports of a tri-port memory module, four ports of a quad-port memory module, and so on).

As used herein, the term "memory media chip" refers to the byte-addressable memory integrated circuits of a memory module for data storage. Memory media chip includes DRAM, storage class memory (SCM), magnetic RAM (MRAM), spin-transfer torque MRAM (STT-MRAM), among others. DRAM includes single data rate (SDR) DRAM, double data rate (DDR) DRAM, and synchronous DRAM (SDRAM), among others.

Signaling to and from a memory module may be provided using differential signaling or single-ended signaling. With single-ended signaling, a single pin is used to transmit each signal. The voltage of each pin is compared to the ground voltage to determine if the signal is a zero or a one. For example, if the voltage on the pin is at least a threshold above the ground voltage, the signal is a logical one and if the voltage does not meet the threshold, the signal is a logical zero. With differential signaling, two pins are used to transmit each signal. The voltage of one pin is compared to the other to determine if the signal is a zero or a one. For example, if the two pins are within a threshold voltage of each other, the signal is a logical zero and if the difference exceeds the threshold, the signal is a logical one.

As used herein, the term "communication lane" refers to a pair of data transfer connections, one for input and one for output. With differential signaling, each communication lane of a memory module uses four pins, two for the input differential signal and two for the output differential signal.

One way to increase the data transfer rate of memory modules is to increase the number of communication lanes, allowing more data to be sent or received in parallel on each clock cycle. However, reducing the size of pins increases cross-talk and increasing the number of pins without reducing their size increases the size of the memory module, neither of which is desirable.

Another way to increase the data transfer rate of memory modules is to increase the operating clock frequency, allowing more data to be transferred per lane per second. The clock frequency for communication between the computing host and the memory module can be increased by a factor and the number of lanes divided by the same factor, keeping the data transfer rate the same while reducing the number of pins on the memory module. A SerDes is implemented on each side of the connection to convert data signals between wide data (e.g., 64 lanes) at a lower frequency (e.g., 1 GHz) and narrow data (e.g., 8 lanes) at a higher frequency (e.g., 8 GHz). Thus, the data from multiple lanes (eight, in this example) is "serialized" and output sequentially onto one lane. On the other side of the connection, sequentially received data is "deserialized" and output in parallel on multiple lanes (also eight, in this example). More complex coding schemes, such as 8B/10B, 64B/65B or 128B/129B than signal multiplexing, may be used in some embodiments.

FIG. 1 illustrates an example of DRAM DIMM system 100. The system 100 includes a DRAM DIMM 110 which includes a register clock driver (RCD) 120 and number of DRAM devices 130, such as eighteen or thirty-six DRAM devices for error correction code (ECC) DIMM. A DRAM DIMM 110 may be attached to a DIMM socket 140, such as to connect the DRAM DIMM 110 to a host (a central processing unit (CPU) or a SoC or a DRAM controller). A DRAM DIMM 110 uses single-port single-ended high-speed signals for attachment to a host. DRAM data rates have been evolving from 200 megatransfers per second (MT/s) in DDR1 in 1998 to 6400 MT/s DDR5 defined by JEDEC in 2020.

Figure 2B:
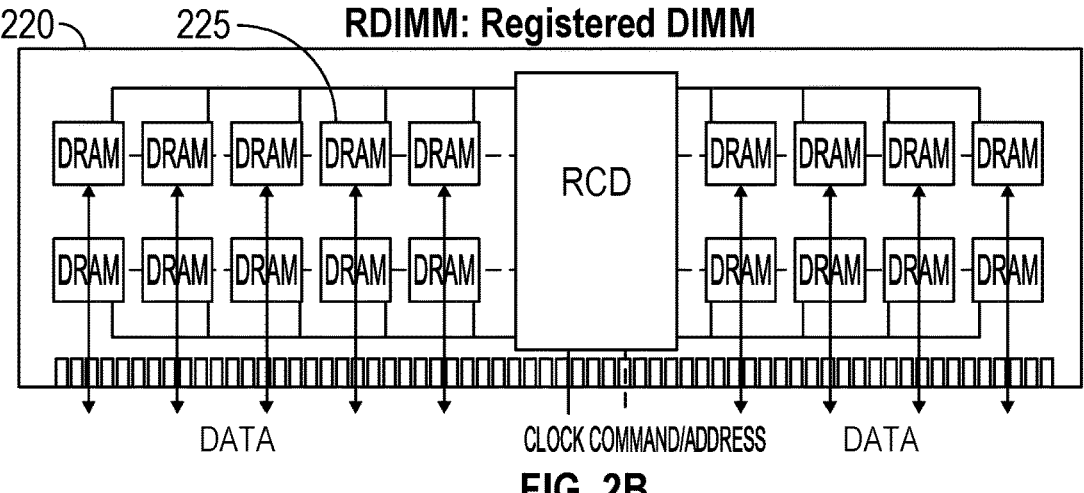
Figure 2C:
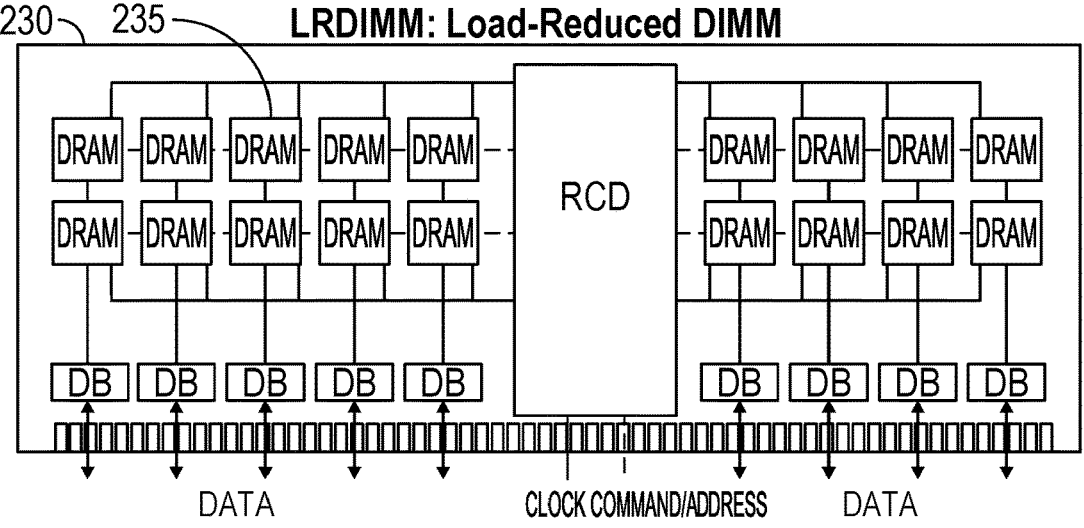

FIGS. 2A-2C illustrate example DIMM configurations 200. The DIMM configurations 200 include unregistered DIMM (UDIMM) 210, where the command, address, data, and clock signals of DRAM chips 215 are connected to a host directly without being registered or regenerated. The DIMM configurations 200 include a registered DIMM (RDIMM) 220, where the command and address signals between the host and DRAM chips 225 are buffered with registers and the clock signal is regenerated with a phase locked loop (PLL), but the data signals are not buffered and connected to the host directly. The DIMM configurations 200 include a load-reduced DIMM (LRDIMM) 230, where the command, address and data signals between the Host and DRAM chips 235 are buffered with registers, and the clock signal is regenerated with a PLL.

FIGS. 3A-3C illustrate an example dual-channel DDR5 DIMM 300 defined by JEDEC DRAM standard committee. The dual-channel DIMM 300 includes a generalized dual-channel DIMM 310, which includes an independent communication channel A 312 and another independent communication channel B 314. The dual-channel DIMM 300 includes an RDIMM 320, which includes an independent RDIMM communication channel A 322 and another independent RDIMM communication channel B 324. The dual-channel DIMM 300 includes an LRDIMM 330, which includes an independent LRDIMM communication channel A 332 and another independent LRDIMM communication channel B 334.

FIGS. 4A-4C illustrate an example double data rate (DDR) throughput comparison 400. The DDR throughput comparison 400 includes a DDR comparison table 410, which compares features of various types of DDR memory. As shown in the table, a 288-pin DDR4 DIMM includes UDIMM, RDIMM, and LRDIMM, uses one 64+8 bits channel per DIMM for data rate up to 3200 MT/s. A 288-pin DDR5 DIMM includes RDIMM and LRDIMM, but splits into two independent 32+8 bits channels for data rate up to 6400 MT/s. The data transfer rate for these DDR4 and DDR5 SDRAM DIMMs with a host may be increased by using a differential Serializer and Deserializer (SerDes) communication interface. As shown in memory capacity improvement graph 420, memory density increases as memory progresses from DDR to DDR5. As shown in memory interface improvement graph 430, transfer rates increase as memory progresses from DDR to DDR5.

Figure 5:
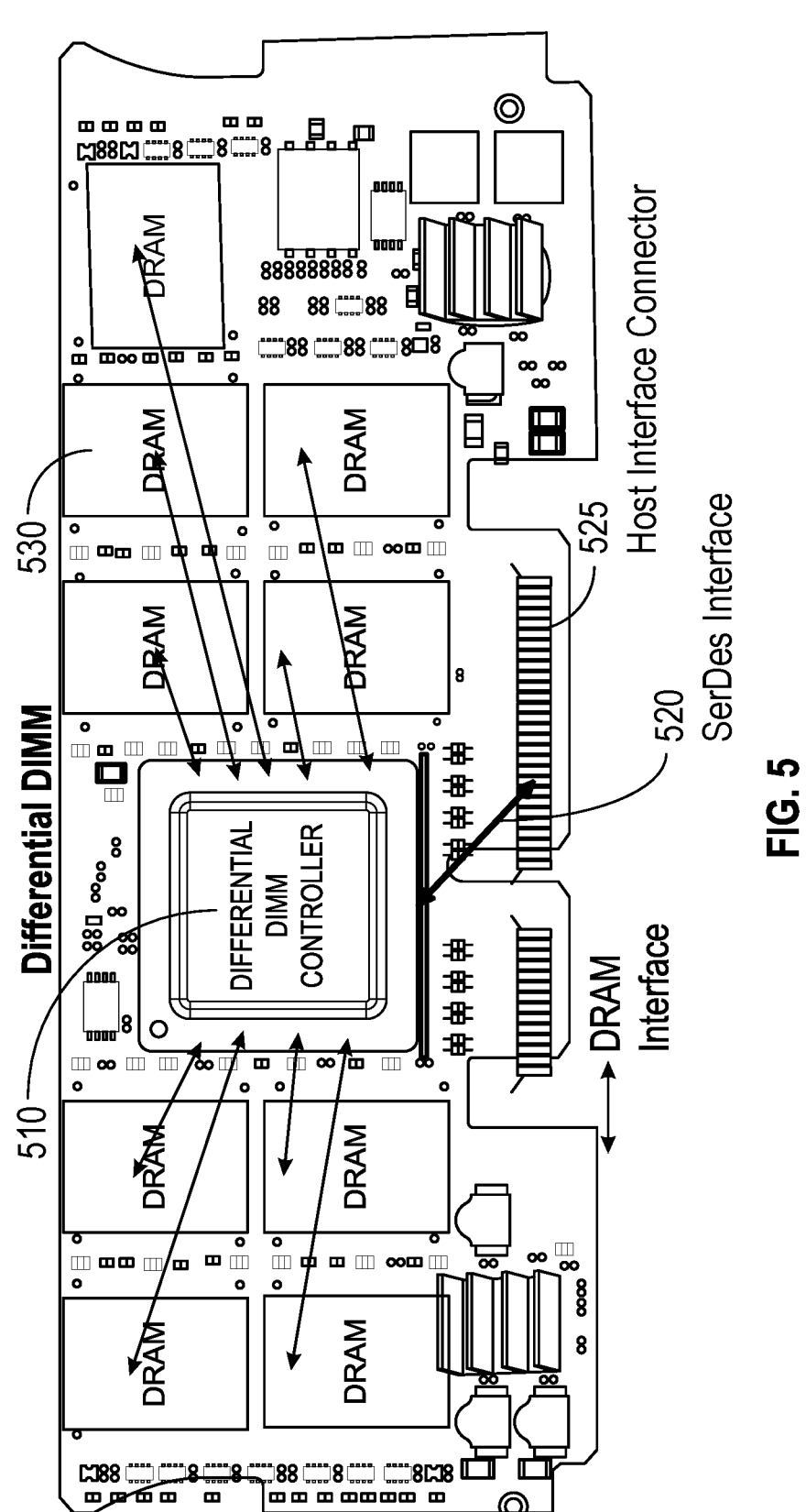
FIG. 5 illustrates a differential DIMM, such as the DDR5 DDIMM defined by the OpenPower community, in which the DIMM is attached to and accessed by a memory controller or a host with integrated memory controller via a high-speed SerDes interface.
Figures 6A, 6B, 6C, 6D, 6E:
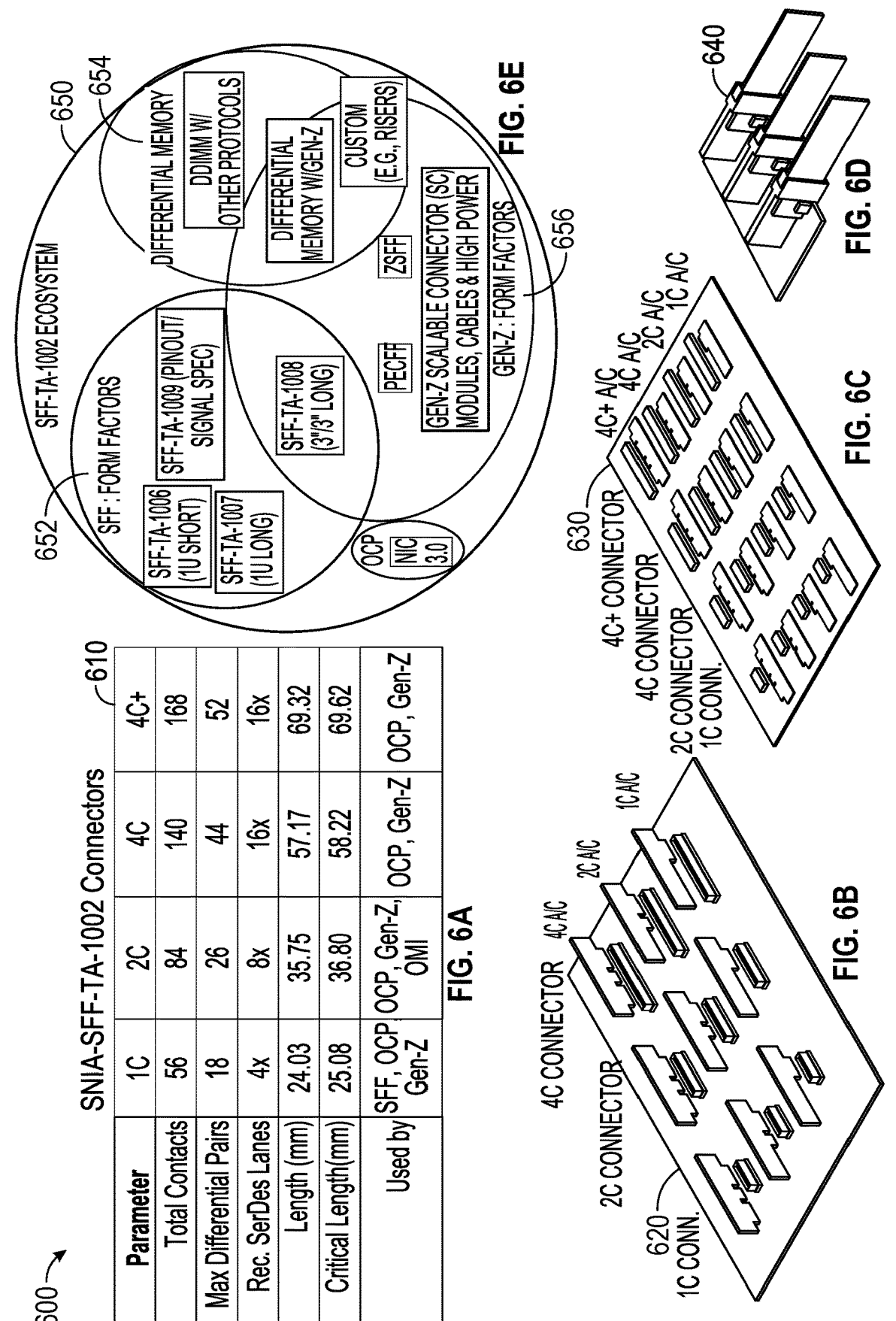
FIGS. 6A-6E illustrate example connectors for differential DIMMs and related information.

FIG. 5 illustrates a differential DIMM 500 such as the one specified and implemented by OpenPower. The differential DIMM 500 includes a differential DIMM controller ASIC 510 that receives command, address, data, and clock signals from a host CPU via a SerDes interface 520 on a host interface connector 525 to a host computer. The differential DIMM controller 510 receives host memory access commands from the SerDes interface and provides memory access to DRAM chips 530. The differential DIMM 500 may use differential SerDes to provide increased speed between the CPU and DIMM 500. A DIMM form factor may include a 25G X8 differential open memory interface (OMI) DDIMM, which may include an 84-pin connector that uses 16 differential pairs for 8×25G SerDes and leaves 20 pins (e.g., 10 differential pairs) for other functions.

FIGS. 6A-6E illustrate example connectors 600 for differential DIMMs and related information. The connector 600 is based on Storage Networking Industry Association (SNIA) protocols, such the SNIA small form factor (SFF) technology affiliate (TA) 1002 protocol. A SNIA-SFF-TA-1002 table 610 shows the features of various connector configurations. The connectors may include various connector configurations, such as vertical connectors 620, right-angle connectors 630, or edge connectors 640. A SNIA-SFF-TA-1002 ecosystem 650 shows the relationships between the SFF form factors 652, differential memory 654, and the Gen-Z form factors 656

Figure 7:
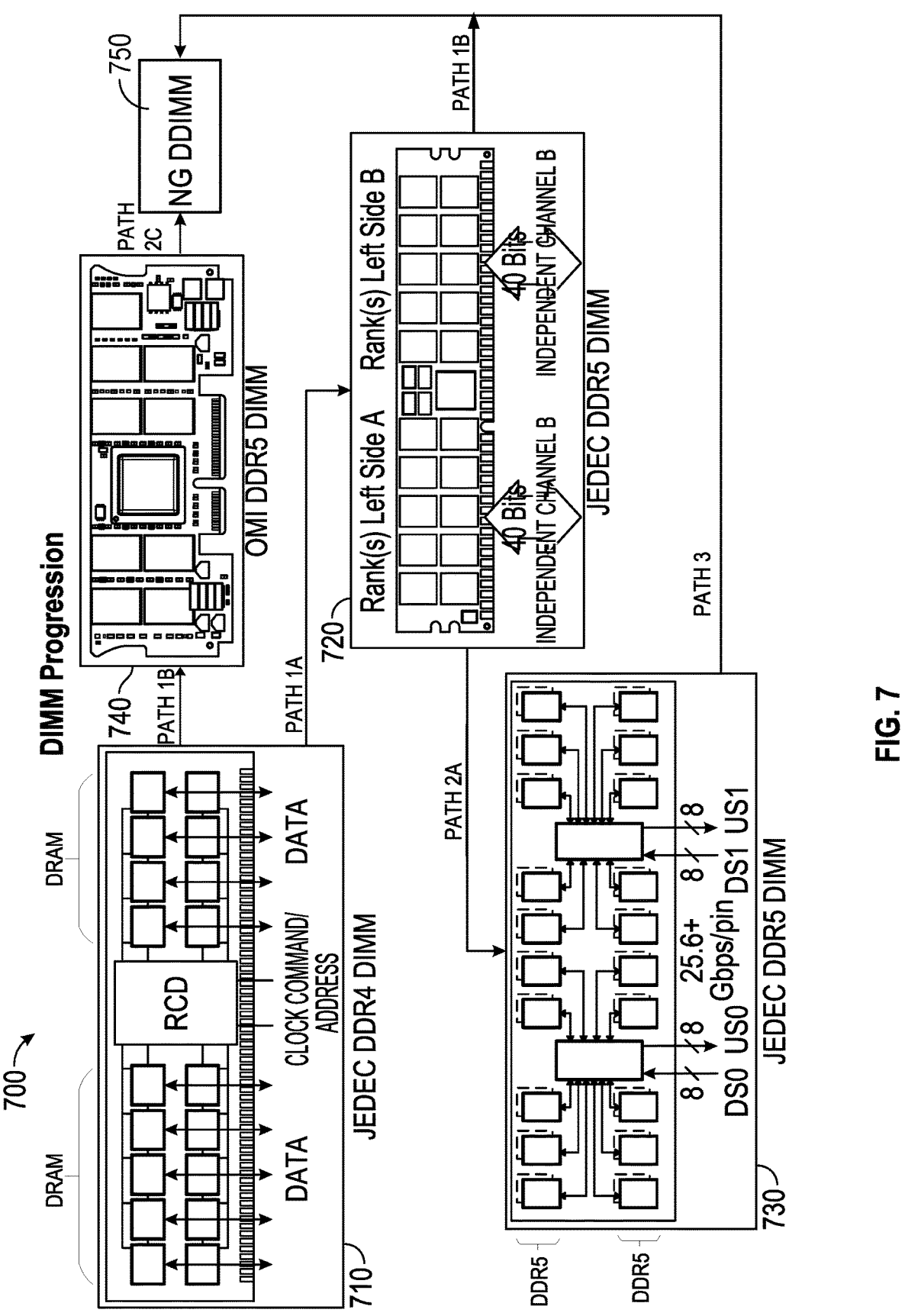
FIG. 7 illustrates the potential evolution paths from existing DDR4 DIMM to the coming DDR5 DIMMs and the next generation (NG) DIMM after DDR5 (DDIMM). Embodiments of the disclosure may be implemented in the NG DDIMM.

FIG. 7 illustrates an example DIMM evolution 700. The DIMM progression 700 includes a Joint Electron Device Engineering Council (JEDEC) DDR4 DIMM 710, which provides a 64-bit channel with single-ended parallel signaling, providing throughput of up to 3200 MT/s. The JEDEC DDR4 DIMM 710 is followed by a JEDEC DDR5 DIMM 720, which provides dual 32-bit channels with single-ended parallel signaling, providing up to 6400 MT/s. The JEDEC DDR5 DIMM 720 may be followed by a JEDEC-proposed DDR5 DIMM 730, which provides dual 32-bit channels with differential SerDes signaling, providing greater than 25 gigatransfers per second (GT/s). As used herein, "high-speed differential signaling" is used to refer to signaling providing 25 GT/s or greater An alternate path for the DIMM progression 700 follows the JEDEC DDR4 DIMM 710 with an OMI DIMM 740 defined by OpenPower with differential SerDes signaling, which may also provide greater than 25 GT/s. This OMI DIMM 740 may use eight 25 Gbps SerDes channels to interface with a host. The DIMM progression 700 includes a next generation (NG) DIMM 750, which may provide a throughput of 112 GT/s or greater; and it is expected that the disclosed dual-port memory module would be one of the NG DIMM form-factors to enable composable memory for composable computing.

Figure 8:
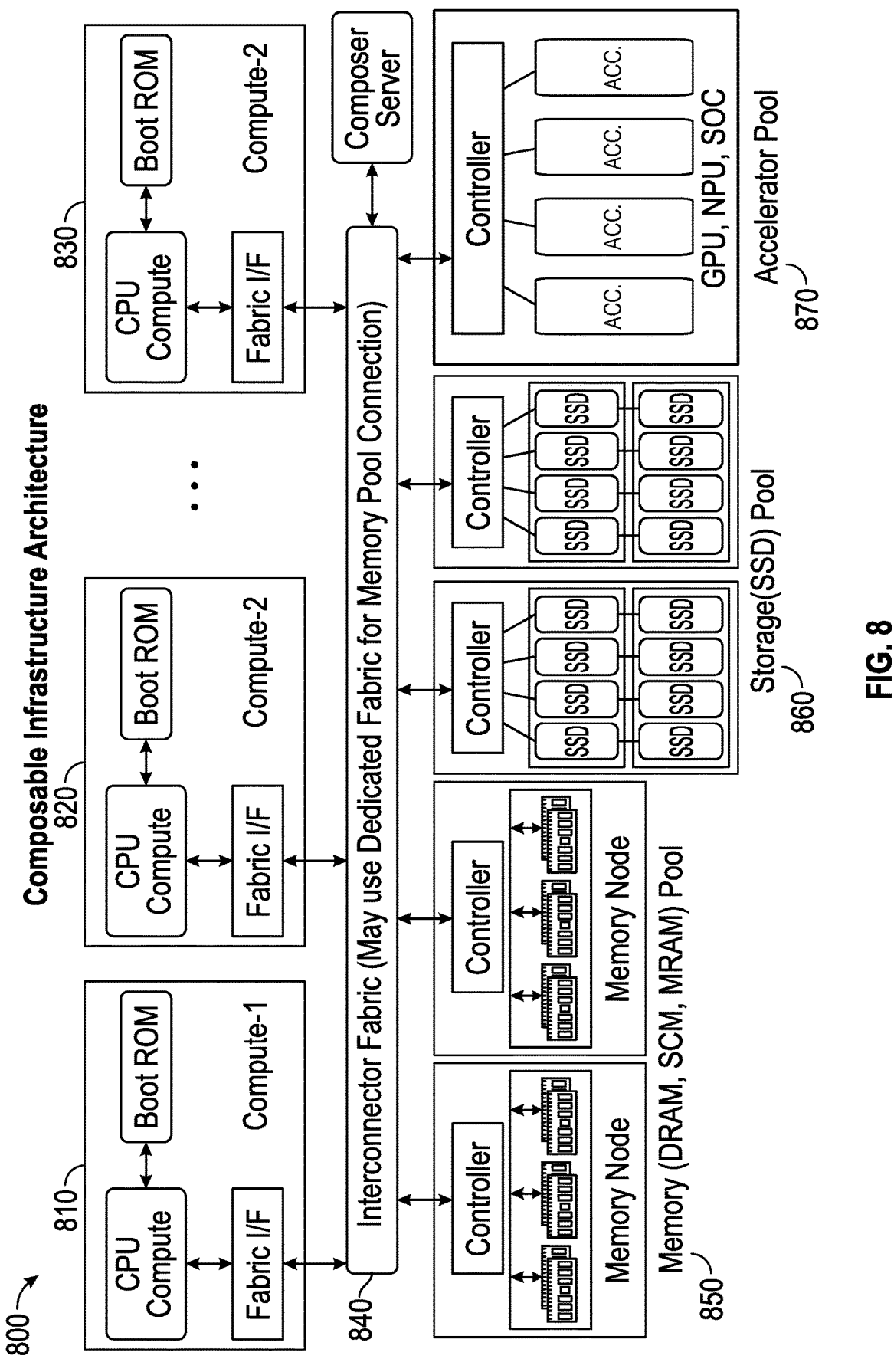
FIG. 8 illustrates an example composable infrastructure architecture where in the memory, storage and accelerators are decoupled from the CPUs as respective resource pools and allocated to CPUs on-demand to form composable servers.
Figures 9A, 9B:
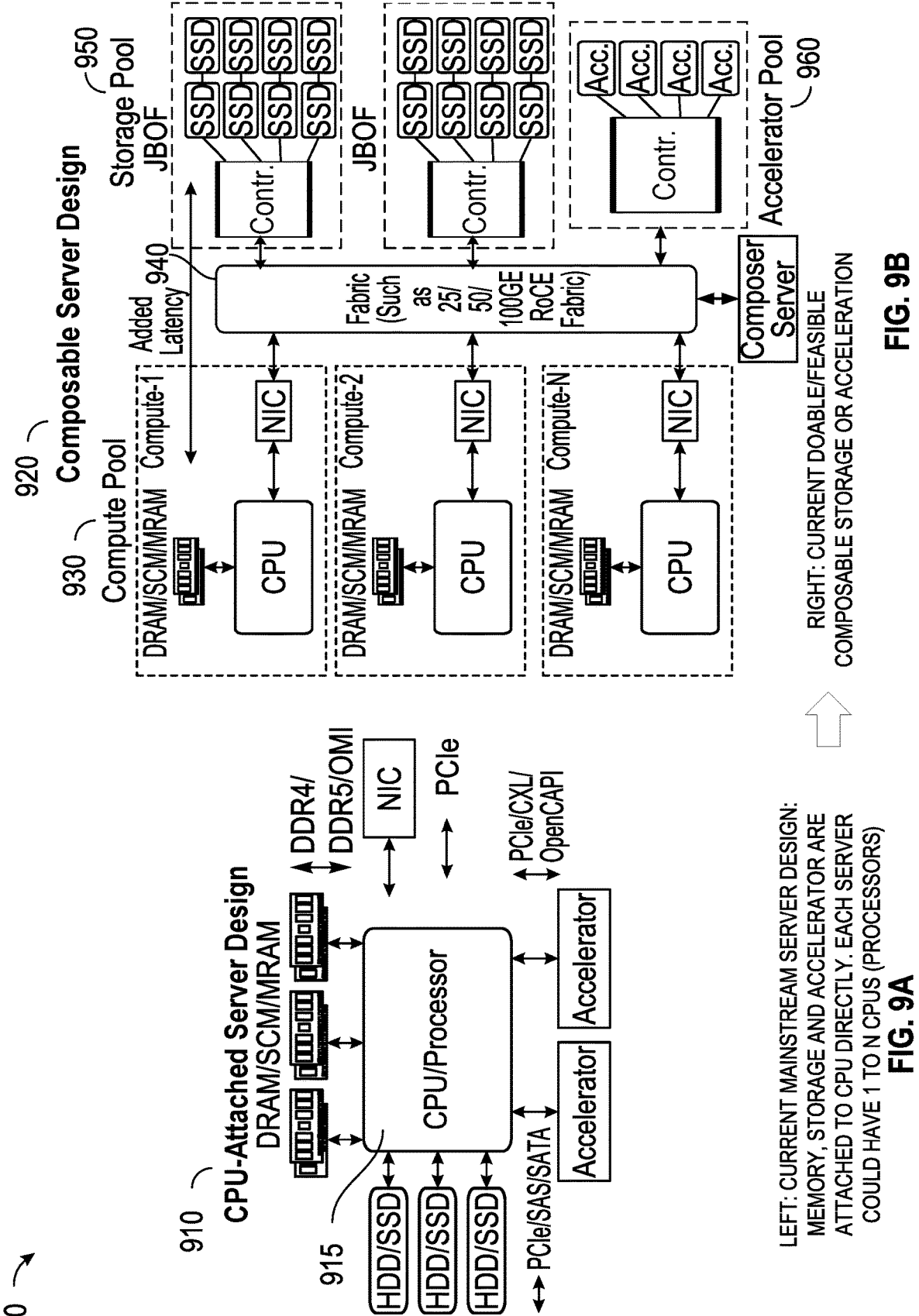

FIG. 8 illustrates an example composable infrastructure architecture 800 in which the disclosure may be used a building block to enable composable memory. The composable infrastructure architecture 800 includes a pool of multiple compute devices 810, 820, and 830, which connect through an interconnector fabric 840 to various resource pools, such as a memory pool 850, a storage pool 860, or an accelerator pool 870. Resources within the various resource pools 850, 860 and 870 may be allocated to a compute device in the compute pool on demand under composer server software control to form application-optimized servers thus enable composable computing.

Because added access latency for the storage pool 860 and the accelerator pool 870 are comparable with CPU instruction execution time (e.g., nanoseconds), the interconnector fabric 840 may provide sufficient access speeds for the storage pool 860 and the accelerator pool 870. In previous configurations, a cache or memory local to a CPU had to be large enough to offset fabric-added latency. The composable infrastructure architecture 800 provides improved performance with CPUs with large capacity on-package HBM memory as described in FIG. 11 and FIG. 12 such that the memory pool 850 does not need to reside on each of the multiple compute devices 810, 820, and 830. To further reduce the interconnect latency, a dedicated interconnect fabric may be used between the compute pool and the memory pool 850.

FIGS. 9A-9E illustrate an example of currently doable (or feasible) composable server architecture 920 on the right compared to the current mainstream server design 910 on the left. The current mainstream server architecture 910 includes memory, storage, and accelerators attached to a CPU 915's corresponding DDR4/DDR5 memory and PCIe interfaces locally. The composable server architecture 920 includes a Compute pool 930, Storage pool 950 and Accelerator pool 960 interconnected with Fabric 940. In contrast with the CPU-directly-attached server design 910, the Compute pool 930 in the composable server architecture 920 is connected via an interconnector fabric 940 to a storage pool 950 and an accelerator pool 960. The composable server architecture 920 provides a fabric-related latency that is relatively small compared to access time required by the storage pool 950 or the accelerator pool 960. In various embodiments, the interconnector fabric 940 may be remote direct memory access (RDMA) over Converged Ethernet (RoCE) fabric on 25/50/100 GE, or other high speed interconnect fabric.

Figure 10:
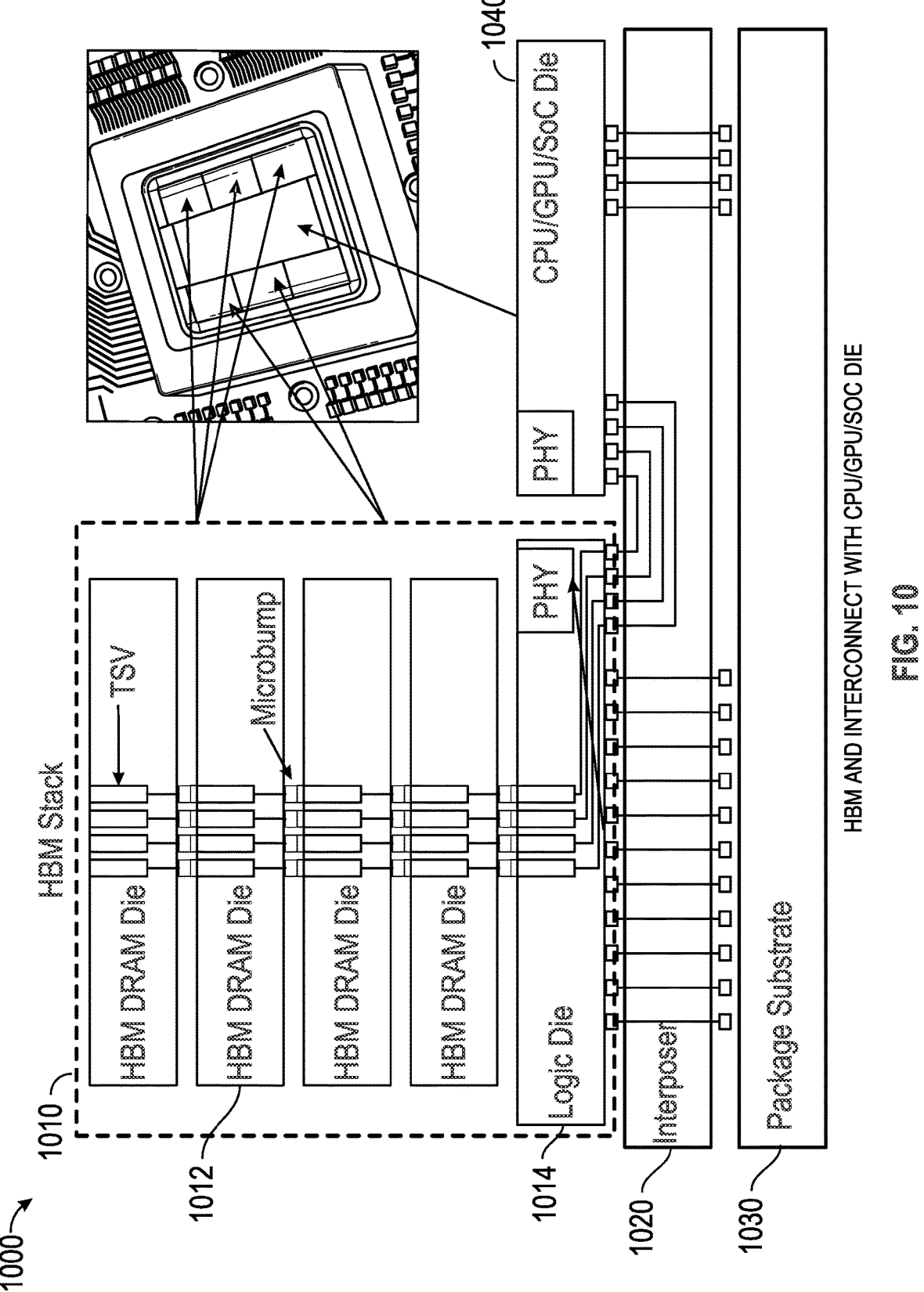
FIG. 10 illustrates an example of SoC with on-package high bandwidth memory (HBM).

FIG. 10 illustrates an example high bandwidth memory (HBM) architecture 1000. The HBM architecture 1000 includes an HBM stack 1010, where HBM stack 1010 uses three-dimensional integrated circuit (3D IC) packaging to stack multiple DDR DRAM dies 1012 vertically over a logic die layer 1014. The HBM stack 1010 is connected through an interposer 1020 to a package substrate 1030. The HBM stack 1010 is also connected through the interposer 1020 to a CPU/GPU/SoC 1040.

FIG. 11 illustrates an example HBM performance table 1100. The HBM performance table 1100 provides a comparison among various HBM configurations, including HBM1, HMB2, HMB2E, and HBM3. The HBM architecture 1000 shown in FIG. 10 may use HBM2E, which may provide 16 GB-24 GB capacity and bandwidth greater than 400 GB/s per stack.

FIG. 12 illustrates an example HBM progression 1200. The HBM progression 1200 includes a chronological progression 1210, which shows a progression from a baseline in 2011 to a projected 4× with a 12 HBM stack projected for 2023 from TSMC. The HBM progression 1200 includes a performance table 1220 for various HBM configurations. As can be seen in performance table 1220, a configuration with 12 HBM stacks on the package where each stack provides 64 GB running at 6.4 Gbps may provide up to 768 GB and 9830

TB/s. The capacity and performance provided by HBM memory co-packaged with CPU enables decoupling the DRAM DIMMs from Compute nodes, forming a memory pool interconnected with the compute nodes over an Interconnect Fabric, and then allocating the DRAM capacity to a requesting Compute node for on-demand expansion. This delivers composable memory for composable computing, which is the target application of the disclosed dual-port memory module.

Figure 13:
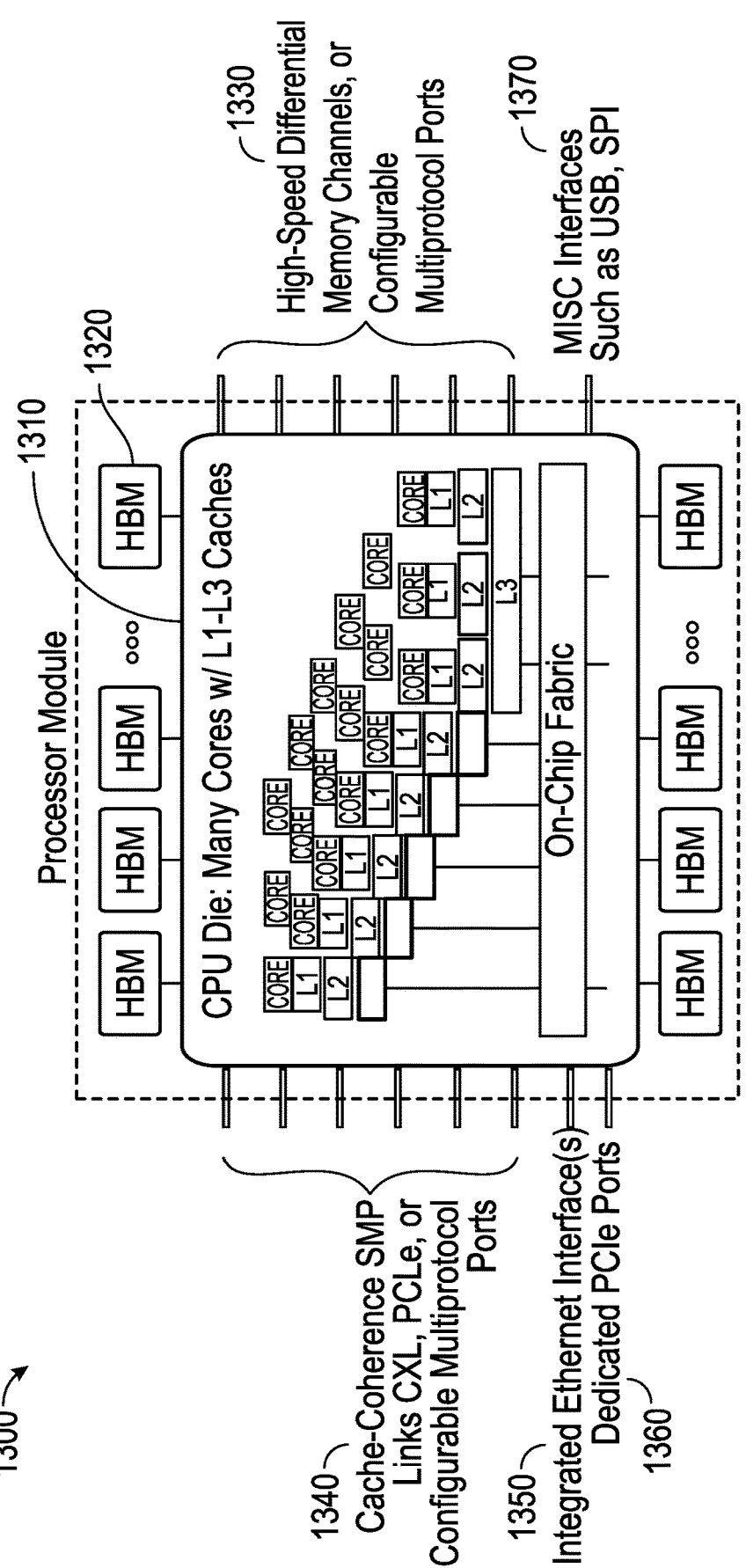
FIG. 13 illustrates an envisioned microprocessor architecture with co-packaged HBM as the main memory.

FIG. 13 illustrates an example of envisioned Processor Module 1300 with co-packaged HBM as system memory that may be available around the time frame of 2025-2030. The envisioned Processor Module 1300 includes a processor die 1310 and a plurality co-packaged HBM stacks 1320 and high-speed differential memory expansion channels or configurable multiprotocol ports 1330 for memory expansion to DRAM, SCM, MRAM, or other RAM on the disclosed dual-port memory modules for composable memory. The processor module 1300 could also include ports 1340 for cache-coherent symmetric multiprocessing (SMP), Compute Express Link (CXL), Peripheral Component Interconnect Express (PCIe), or additional configurable multiprotocol ports. The processor module 1300 could also include integrated ethernet interfaces 1350, optional dedicated PCIe ports 1360, and miscellaneous interfaces 1370 (e.g., USB, Serial Peripheral Interface).

Figure 14:
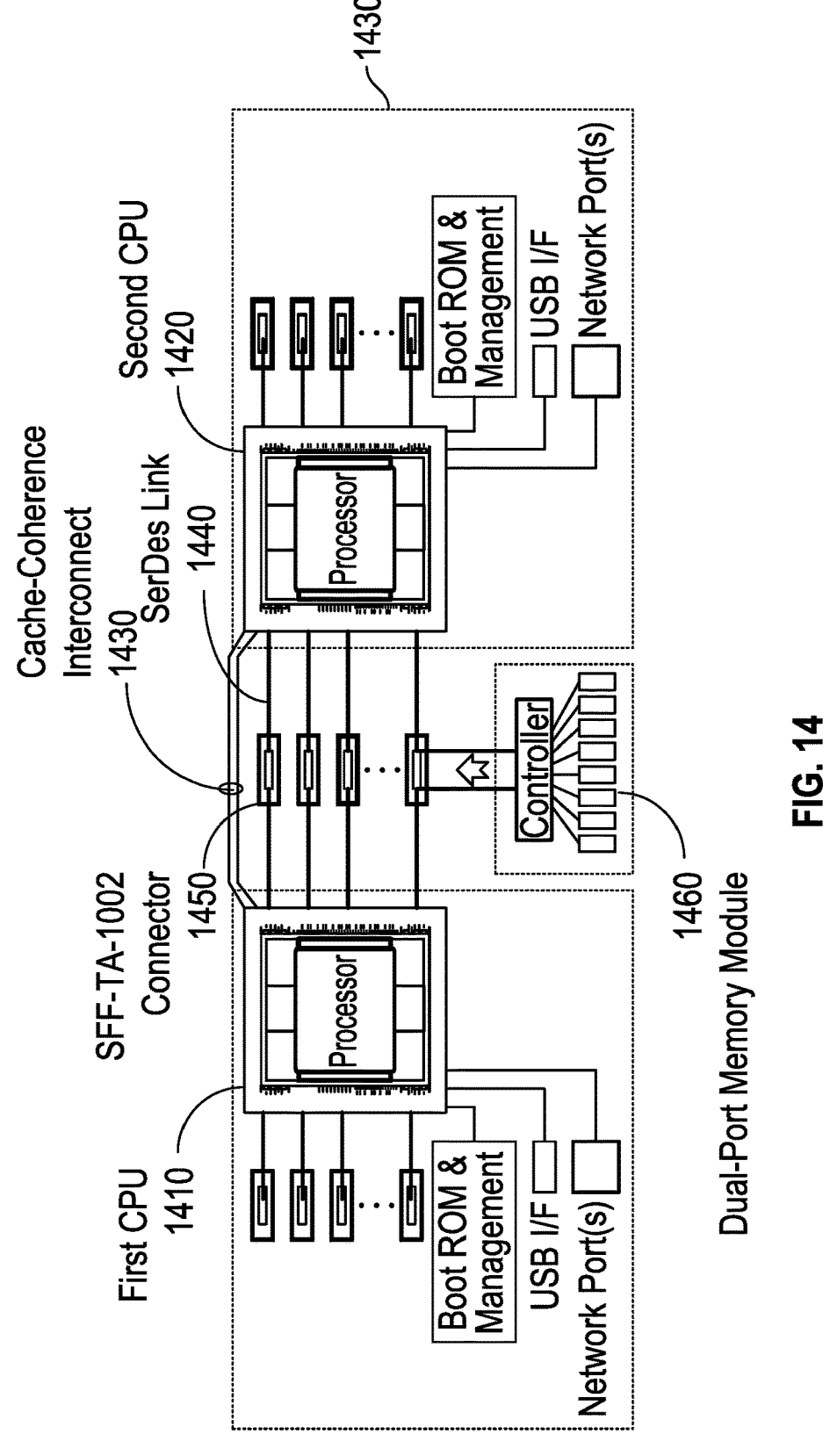
FIG. 14 illustrates an application example of the disclosure in a new server architecture design with the microprocessor illustrated in FIG. 13.

FIG. 14 illustrates an application example of the disclosed dual-port memory module in a cache-coherent dual-socket compute node architecture 1400. The cache-coherent dual-socket compute node architecture 1400 includes a first CPU 1410 connected to a second CPU 1420, which use a cache-coherence interconnect 1430 to maintain cache coherency protocol control messages and use the dedicated SerDes interface to access the memory on the disclosed dual-port memory modules 1460 which has one SerDes port 1440 to each of the two CPUs. The disclosed dual-port memory module 1460 is attached to the CPUs via connector 1450 which could be but not limited to an SFF-TA-1002 compliant connector.

Figure 15:
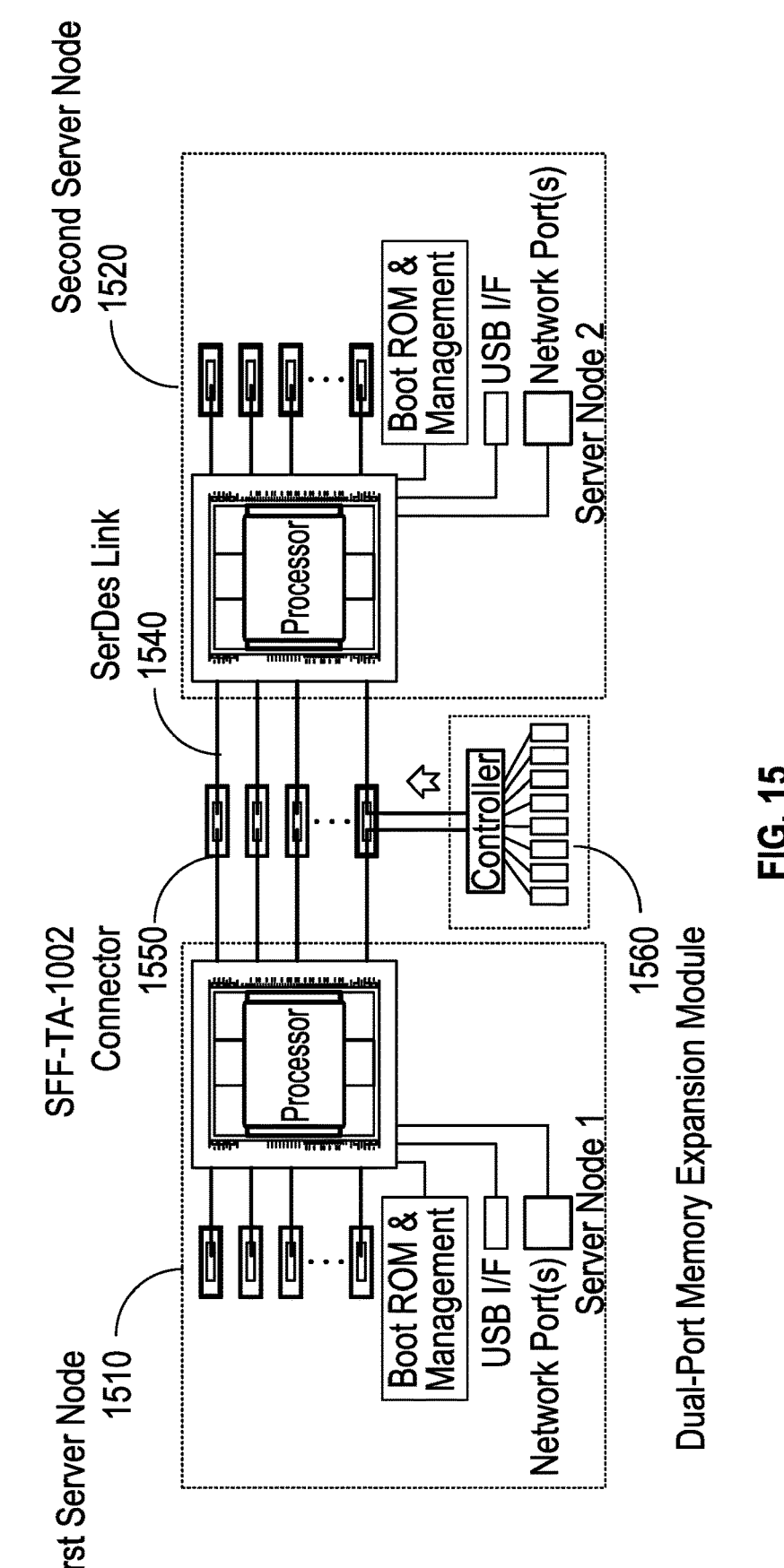
FIG. 15 illustrates another application example of the disclosure for two server nodes sharing a dual-port memory module for composable memory capacity between the two server nodes.

FIG. 15 illustrates an application example of two server nodes composable memory architecture 1500 in which one or more the disclosed dual-port memory modules are shared by the two server nodes on the same PCB and the memory capacity of the disclosed dual-port memory module(s) could be allocated to either server node on-demand. The composable memory architecture 1500 includes a first server node 1510 connected to a second server node 1520. Each of the first server node 1510 and the second server node 1520 may include respective processors, boot ROM and management, an interface port, and a network port. The composable memory architecture 1500 includes one or more dual-port memory expansion modules 1560, which may provide shared access to DRAM, SCM, MRAM, or other RAM on the port memory expansion module 1560. This composable memory architecture 1500 provides a direct access path from the first server node 1510 and the second server node 1520 to the dual-port memory expansion module 1560 using SerDes links 1540 and SFF-TA-1002 connectors 1550 and the memory capacity of the dual-port memory module 1560 could be allocated to either server node on-demand to deliver composable memory capacity between server nodes via dual-port differential memory module 1560.

Figure 16:
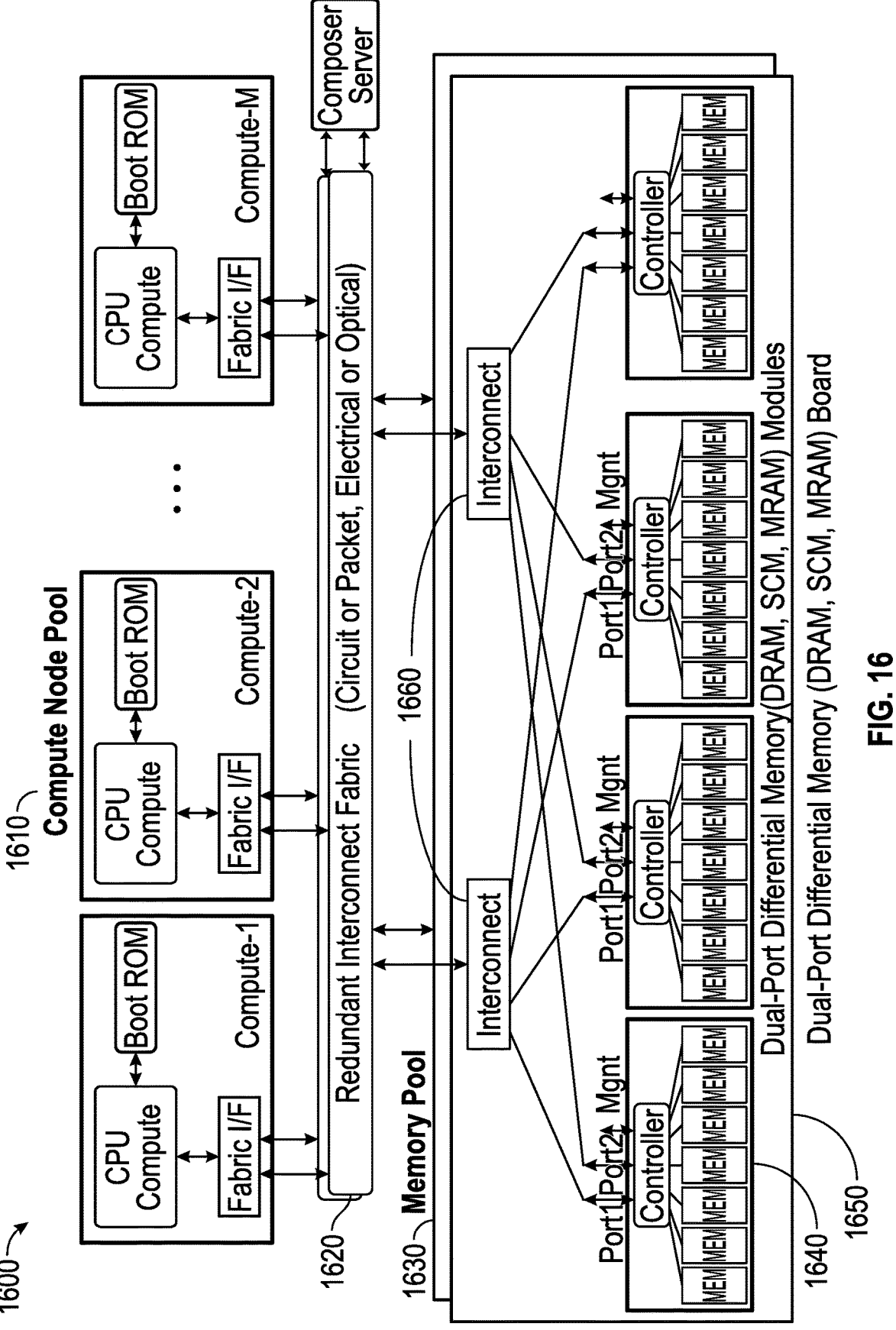
FIG. 16 illustrates an application example of the disclosure for an architecture of composable infrastructure with composable memory capacity pool attached to a compute pool over an interconnect fabric. In this composable infrastructure, the disclosed dual-port memory module is used on the dual-port memory expansion boards.

FIG. 16 illustrates another application example of the disclosed dual-port memory module for composable memory architecture 1600. The composable memory architecture 1600 includes a compute node pool 1610 connected through a redundant interconnect fabric 1620 to a memory pool 1630. The memory pool 1630 includes multiple disclosed dual-port memory modules 1640 aggregated with two Interconnect ASICs 1660 and installed on a dual-port memory board 1650. In one application scenario, each of the dual-port memory modules 1640 includes two high-speed SerDes-based redundant access ports connected to one or two compute nodes within the compute node pool 1610 once at a time via the two Interconnect ASICs and the memory capacity of dual-port memory module 1640 is allocated to the compute nodes connected to one of its two ports, which provides access to part or all of the memory with each of the dual-port memory modules 1640. In another application scenario, all of the disclosed dual-port memory modules 1640 in the memory pool 1630 are shared by all or some of the compute nodes in the compute pool 1610 with two redundant access paths. This composable memory architecture 1600 provides memory capacity composability, expansion and sharing, which improves memory access performance enhancement. The details of the composable memory architecture 1600 are out of the scope of this disclosure.

Figure 17:
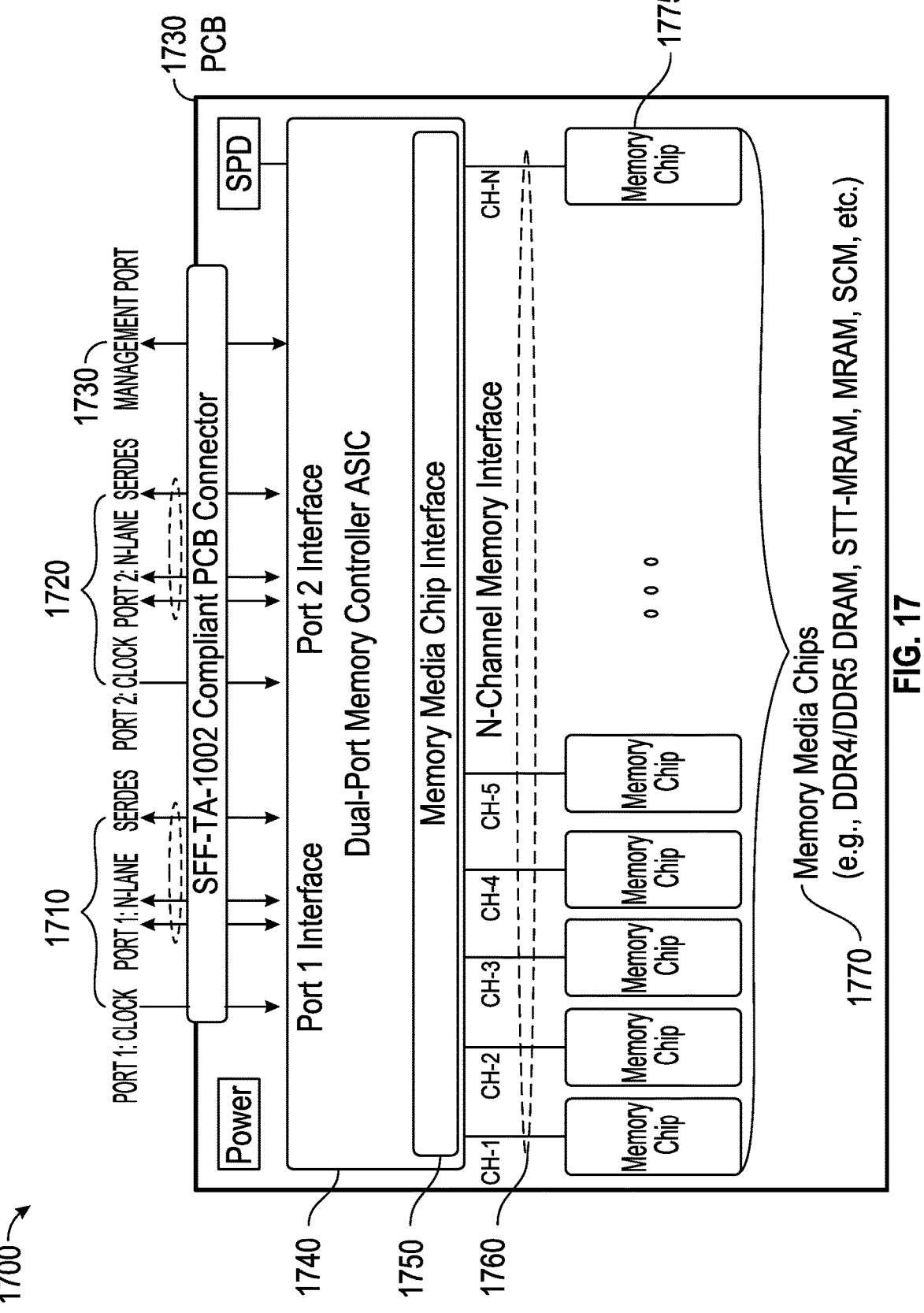
FIG. 17 illustrates the key block diagram of the disclosed dual-port memory module.

FIG. 17 illustrates an example of the disclosed dual-port differential memory module 1700 in which embodiments of the disclosure may be implemented. The disclosed dual-port memory module 1700 consists of a dual-port memory controller ASIC 1740, a plurality of memory media chips 1775 connected to the controller ASIC 1740 over the N-Channel memory interface 1760, a SPD attached and accessed by controller ASIC 1740, as well as other components such as power circuits, clock distribution circuits, and a PCB 1780 on which all the devices are mounted on. In an embodiment, the PCB 1780 also implements an SNIA-SFF-TA-1002 compliant PCB connector for the host and management interfaces. In an embodiment, the dual-port differential memory module 1700 includes a first data access port 1710 and a second data access port 1720, which may be used to provide data access for up to two hosts directly. The first data access port 1710 and the second data access port 1720 each consists of one or multiple SerDes lanes, such as using two, four, eight, or more SerDes lanes. In an embodiment, each of the first data access port 1710 and the second data access port 1720 has a differential clock input. The first data access port 1710 and the second data access port 1720 are connected to the Port 1 and Port 2 of the dual-port memory controller ASIC 1740 respectively.

The dual-port differential memory module 1700 may include a lower speed management port 1730 for communications with a management or composer server for module initialization, configuration, monitoring, memory capacity allocation and address mapping management, but the detailed management command and message formats are out of the scope of this disclosure. The management port 1730 is connected to the management port of the dual-port memory controller ASIC 1740. The management port 1730 may communicate using a server message block (SMB) protocol, an Inter-Integrated Circuit (I2C/I3C) protocol, a Controller Area Network (CAN) bus protocol, an Ethernet protocol or other networking protocols. The management port 1730 may be used to configure part or all of the memory within the dual-port differential memory module 1700 to be accessible to hosts via either the first data access port 1710 or the second data access port 1720. This configurations of memory capacity allocation and address mapping between the address present on the ports and the address of the memory chips may be persistent across a power cycle or reset event of the dual-port differential memory module 1700, such as by storing and retrieving the memory capacity allocation and address mapping configurations.

The first data access port 1710 and the second data access port 1720 may be implemented on a common dual-port memory controller application specific integrated circuit (ASIC) 1740. The dual-port memory controller ASIC 1740 may include a memory media chip interface 1750 consisting of N memory media interface channels 1760 for connection to a plurality of memory media chips 1775. The value of N could be any positive integer but is typically 18 or 36 to support ECC memory module just as DDR4 and DDR5 DIMMs. The memory media chip interface 1750 could be single-ended JEDEC DDR4, DDR5, or any other future single-ended or differential memory media chip interface.

The dual-port memory controller ASIC 1740 may perform necessary memory initiation and configuration operations according to the populated memory chips 1775 without requiring intervention from any host. In an embodiment, the configuration operations include configuring based on memory configuration information, which may include populated memory media chip type, capacity, configuration, speed, and the number of the memory chips populated on each memory interface channel The dual-port memory controller ASIC 1740 may retrieve memory configuration information from an on-module, such as a serial presence detect (SPD) device. These configuration operations may prepare the dual-port differential memory module 1700 ready to be accessed by a host over either of the first data access port 1710 or the second data access port 1720 if the memory capacity has been allocated to and the data access port is enabled by the management or composer server over module's management interface. The dual-port memory controller ASIC 1740 allocates the requested amount of memory capacity to the first data access port 1710 and the second data access port 1720 and sets the proper address mapping between the data access port memory address and the address of the memory media chips 1775 according to the instructions it receives from the management or composer server over the management port. The dual-port memory controller ASIC 1740 also enables or disables the first data access port 1710 or the second data access port 1720 according to the instructions it receives from the management or composer server over the management port, and once disabled the corresponding data access port will not respond to any host request received. A host accesses the dual-port memory module's memory capacity with memory-semantic LOAD(READ) and STORE(WRITE) memory access commands through the first data access port 1710 or the second data access port 1720 to which it is connected to. The communication protocol over which the hosts' memory access commands are transported could be CXL, Gen-Z, OpenCAPI, PCIe, or emerging memory-semantic protocols.

In an embodiment, the form-factor, electrical interface, and data access protocol of the dual-port differential memory module 1700 are selected to be memory media agnostic. This memory agnostic architecture enables various types of memory to be used (e.g., DRAM, SCM, MRAM/STT-MRAM) for the memory chips 1775.

FIG. 18 is a flow diagram of features of an embodiment of an example method 1800 of a dual-port memory module (e.g., the dual-channel DIMM 1700 of FIG. 17). In operation 1810, upon a power-on or reset event, the dual-port memory controller ASIC initializes and configures the dual-port memory module based on the module and memory media chip information read from the SPD. In operation 1820, the dual-port memory controller ASIC determines if the module memory capacity has been allocated to the data access port(s), and the corresponding data access port(s) is enabled from previously saved configurations in SPD or other persistent memory locations inside or outside the dual-port memory controller ASIC.

In operation 1830, if the data access port (i.e., host) has not been allocated memory capacity and enabled, then the dual-port memory controller waits for and receives commands from the management or composer server over the management interface and allocates memory capacity to and enable one or more data access ports.

In operation 1840, once one or more data access ports are configured and enabled, the dual-port memory controller ASIC will service the requests from one or more hosts received over the data access ports. In operation 1850, the dual-port memory controller ASIC determines whether the request received from the host includes a read request or a write request.

Responsive to determining the request includes a read request, in operation 1860, the dual-port memory controller ASIC services the host read request by reading the data from the designated memory location of the memory media chips and returning the read data to the requesting host over the data access port to which the requesting host is connected. Subsequently, method 1800 includes returning to operation 1840 to service the next host-request.

Responsive to determining the request includes a write request, in operation 1870, the dual-port memory controller ASIC services the host write request by writing the data from the host to the designated memory location of the memory media chips and acknowledging the requesting host the completion of the write request. Subsequently, method 1800 includes returning to operation 1840 to service the next host-request.

Figure 19:
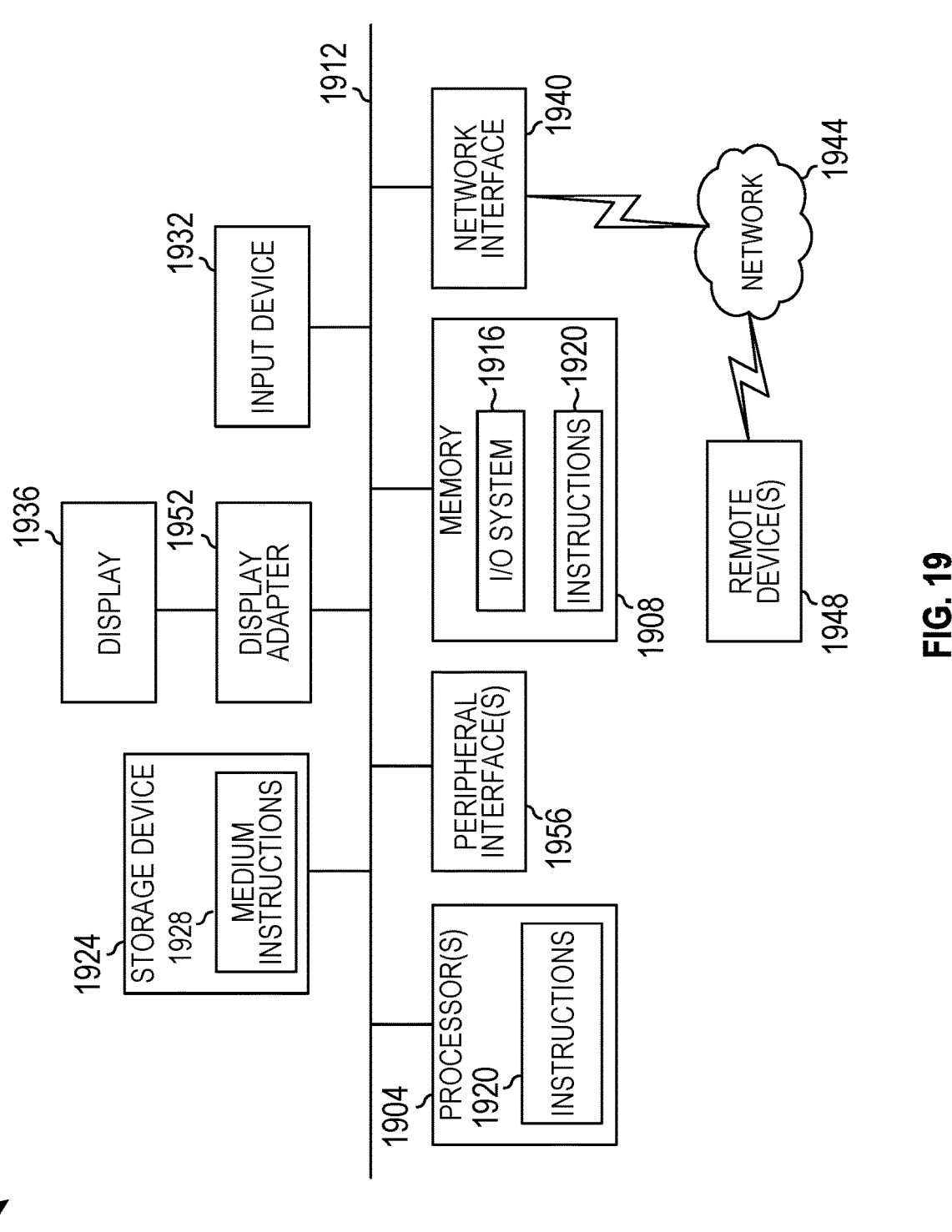
FIG. 19 shows an example embodiment of a computing system for implementing embodiments of the disclosure.

FIG. 19 shows an example embodiment of a computing system 1900 for implementing embodiments of the disclosure. The computing system 1900 can include a processor 1904 and a memory 1908 that communicate with each other, and with other components, via a bus 1912. The bus 1912 can include any of several types of bus structures including, but not limited to, a memory bus, a memory controller, a peripheral bus, a local bus, and any combinations thereof, using any of a variety of bus architectures.

The memory 1908 can include various components (e.g., machine-readable media such as computer-readable media) including, but not limited to, a random-access memory component, a read only component, and any combinations thereof. In an example, a Basic input/output system 1916 (BIOS), including routines that help to transfer information between elements within computing system 1900, such as during start-up, can be stored in the memory 1908. The memory 1908 can also include (e.g., stored on one or more machine-readable media) instructions (e.g., software) 1920 embodying any one or more of the aspects and/or methodologies of the present disclosure. In another example, the memory 1908 can further include any number of program modules including, but not limited to, an operating system, one or more application programs, other program modules, program data, and any combinations thereof.

The computing system 1900 can also include a storage device 1924. Examples of a storage device, for example the storage device 1924, can include, but are not limited to, a hard disk drive, a magnetic disk drive, an optical disc drive in combination with an optical medium, a solid-state memory device, and any combinations thereof. The storage device 1924 can be connected to the bus 1912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In an example, the storage device 1924, or one or more components thereof, can be removably interfaced with the computing system 1900, for example, via an external port connector (not shown). Particularly, the storage device 1924 and an associated machine-readable medium 1928 can provide nonvolatile and/or volatile storage of machine-readable instructions, data structures, program modules, and/or other data for the computing system 1900. In an example, the software 1920 can reside, completely or partially, within the machine-readable medium 1928. In another example, the software 1920 can reside, completely or partially, within the processor 1904.

Computing system 1900 can also include an input device 1932. In one example, a user of the computing system 1900 can enter commands and/or other information into the computing system 1900 via the input device 1932. Examples of the input device 1932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. The input device 1932 can be interfaced to the bus 1912 via any of a variety of interfaces (not shown) including, but not limited to, a serial interface, a parallel interface, a game port, a USB interface, a FIREWIRE interface, a direct interface to the bus 1912, and any combinations thereof. The input device 1932 can include a touch screen interface that can be a part of or separate from a display 1936, discussed further below. The input device 1932 can be utilized as a user selection device for selecting one or more graphical representations in a graphical interface as described above.

A user can also input commands and/or other information to the computing system 1900 via the storage device 1924 (e.g., a removable disk drive, a flash drive, etc.) and/or a network interface device 1940. A network interface device, such as the network interface device 1940, can be utilized for connecting the computing system 1900 to one or more of a variety of networks, such as a network 1944, and one or more remote devices 1948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as the network 1944, can employ a wired and/or a wireless mode of communication. In general, any network topology can be used. Information (e.g., data, the software 1920, etc.) can be communicated to and/or from the computing system 1900 via the network interface device 1940.

The computing system 1900 can further include a video display adapter 1952 for communicating a displayable image to a display device, such as the display 1936. Examples of a display device include, but are not limited to, a liquid crystal display (LCD), a cathode ray tube (CRT), a plasma display, a light emitting diode (LED) display, and any combinations thereof. The video display adapter 1952 and the display 1936 can be utilized in combination with the processor 1904 to provide graphical representations of aspects of the present disclosure. In addition to a display device, the computing system 1900 can include one or more other peripheral output devices including, but not limited to, an audio speaker, a printer, and any combinations thereof. Such peripheral output devices can be connected to the bus 1912 via a peripheral interface 1956. Examples of a peripheral interface include, but are not limited to, a serial port, a USB connection, a FIREWIRE connection, a parallel connection, and any combinations thereof.

The present subject matter may be embodied in many different forms and should not be construed as being limited to the embodiments set forth herein. Indeed, the subject matter is intended to cover alternatives, modifications, and equivalents of these embodiments, which are included within the scope of the subject matter. Furthermore, in the detailed description of the present subject matter, numerous specific details are set forth to provide a thorough understanding of the present subject matter. However, it will be clear to those of ordinary skill in the art that the present subject matter may be practiced without such specific details.

Machine-readable storage media, such as computer-readable storage media (medium), exclude (excludes) propagated signals per se, can be accessed by a computer and/or processor(s), and include(s) volatile and non-volatile internal and/or external media that is removable and/or non-removable. For a computer, the various types of storage media accommodate the storage of data in any suitable digital format. Other types of computer-readable medium can be employed such as zip drives, solid state drives, magnetic tape, flash memory cards, flash drives, cartridges, and the like, for storing computer-executable instructions for performing the novel methods (acts) of the disclosed architecture.

The description of the present disclosure has been presented for purposes of illustration and description, but is not intended to be exhaustive or limited to the disclosure in the form disclosed. Modifications and variations will be apparent to those of ordinary skill in the art without departing from the scope of the disclosure. For purposes of this document, each process associated with the disclosed technology may be performed continuously and by one or more computing devices. Each step in a process may be performed by the same or different computing devices as those used in other steps, and each step need not necessarily be performed by a single computing device.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A dual-port memory module device operable to access computer memory, the device comprising:

a plurality of memory media chips providing random access memory (RAM) capacity; and a dual-port memory controller application specific integrated circuit (ASIC) operable to allocate a first dedicated portion of the RAM capacity to a first computing host such that the first computing host is restricted to accessing only the first dedicated portion of the RAM capacity, and allocate a second dedicated portion of the RAM capacity to a second computing host such that the second computing host is restricted to accessing only the second dedicated portion of the RAM capacity, the dual-port memory controller ASIC including:

a first interface port independently coupled to the first computing host and configured to enable direct access to the first dedicated portion of the RAM capacity;

a second interface port independently coupled to the second computing host and configured to enable direct access to the second dedicated portion of the RAM capacity; and a plurality of memory interface channels operable to configure, read data from, and write data to the plurality of memory media chips based on the allocation of the first dedicated portion of the RAM capacity to the first computing host and the allocation of the second dedicated portion of the RAM capacity to the second computing host:

wherein the dual-port memory controller ASIC is further operable to, upon power-on, initialize the memory media chips by reading configuration data from an on-module serial presence detect device, and to restore the allocation of the first and second dedicated portions of the RAM capacity to the first and second computing hosts based on allocation data stored in non-volatile memory.

2. The device of claim 1, further including a management port operable to receive module configuration and management data from a configuration management or composer server, wherein the allocation of the first dedicated portion of the RAM capacity and the second dedicated portion of the RAM capacity is based on the received module configuration and management data.

3. The device of claim 2, further including a protocol agnostic multi-lane connector operable to:

couple the first interface port to the first computing host;

couple the second interface port to the second computing host; and couple the management port to the configuration management or composer server.

4. The device of claim 1, wherein the first computing host accesses the first dedicated portion of the RAM capacity and the second computing host accesses the second dedicated portion of the RAM capacity with memory-semantic LOAD (READ) and STORE (WRITE) commands.

5. The device of claim 1, wherein the first interface port and the second interface port each include a Serial and Deserializer (SerDes) port consisting of a plurality of differential lanes for memory access protocol communication.

6. The device of claim 1, further comprising a serial presence detect device, wherein:

the dual-port memory controller ASIC reads a memory media configuration from the serial presence detect device; and the configuration of the memory media chips is based on the memory media configuration.

7. The device of claim 6, wherein the memory media configuration includes at least one of a memory media type, a memory media capacity, a memory media speed, or a number of memory media chips.

8. The device of claim 1, wherein the dual-port memory controller ASIC is further operable to:

store memory usage allocation data in a dedicated memory device, the allocation data including address mapping information for each host; and in response to a device power cycle or reset event:

retrieve the memory usage allocation data from the non-volatile memory device; and restore the allocation and address mapping of the first dedicated portions of the RAM capacity to the first computing host and the second computing host to provide a persistent configuration.

9. A method of accessing computer memory comprising:

receiving a module configuration request at a management port of a dual-port memory controller application specific integrated circuit (ASIC) of a dual-port memory module coupled by a first interface port independently to a first computing host and coupled by a second interface port independently to a second computing host;

allocating, in response to receiving the module configuration request, a first dedicated portion of RAM capacity to the first computing host such that the first computing host is restricted to accessing only the first dedicated portion of the RAM capacity, and allocate a second dedicated portion of the RAM capacity to the second computing host such that the second computing host is restricted to accessing only the second dedicated portion of the RAM capacity;

upon power-on, initializing memory media chips providing the RAM capacity by reading configuration data from an on-module serial presence detect device of the dual-port memory module; and restoring the allocation of the first dedicated portion of the RAM capacity to the first computing host and the second dedicated portion of the RAM capacity to the second computing host based on allocation data stored in non-volatile memory of the dual-port memory module.

10. The method of claim 9, further including receiving a module configuration and management data from a configuration management or composer server via a management port at the dual-port memory controller ASIC, wherein the allocation of the first dedicated portion of the RAM capacity to the first computing host and the second dedicated portion of the RAM capacity to the second computing host is based on the received module configuration and management data.

11. The method of claim 10, wherein the dual-port memory controller ASIC includes a plurality of memory media chips.

12. The method of claim 10, wherein:

the dual-port memory controller ASIC includes a first interface port coupled to the first computing host and a second interface port coupled to the second computing host; and the dual-port memory controller ASIC further includes a protocol agnostic multi-lane connector operable to:

couple the first interface port to the first computing host;

couple the second interface port to the second computing host; and couple the management port to the configuration management or composer server.

13. The method of claim 9, wherein the first computing host accesses the first dedicated portion of the RAM capacity and the second computing host accesses the second dedicated portion of the RAM capacity with memory-semantic LOAD (READ) and STORE (WRITE) commands.

14. The method of claim 9, further comprising communicating with the first host via a communication interconnect.

15. The method of claim 9, further comprising:

receiving data on a Serial and Deserializer (SerDes) port consisting of a plurality of differential memory lanes for access protocol communication.

16. The method of claim 11, further including configuring, at the dual-port memory controller ASIC, the memory media chips for access by the first computing host and the second computing host.

17. The method of claim 16, further including reading, at the dual-port memory controller ASIC, a memory media configuration from a serial presence detect device, wherein the configuration of the memory media chips is based on the memory media configuration.

18. The method of claim 17, wherein the memory media configuration includes at least one of a memory media type, a memory media capacity, a memory media speed, or a number of memory media chips.

19. The method of claim 9, further including:

storing memory usage allocation data that indicates the allocation of the first dedicated portion of the RAM capacity to the first computing host and the allocation of the second dedicated portion of the RAM capacity to the second computing host; and in response to a device power cycle or reset event:

retrieving the memory usage allocation data; and restoring the allocation of the first dedicated portion of the RAM capacity to the first computing host and the second dedicated portion of the RAM capacity to the second computing host to provide a persistent configuration in response to the device power cycle or reset event.

\* \* \* \* \*